United States Patent
Ichimori

(10) Patent No.: US 9,407,305 B2
(45) Date of Patent: Aug. 2, 2016

(54) INSTRUCTION BEAM DETECTION APPARATUS AND METHOD OF DETECTING INSTRUCTION BEAM

(75) Inventor: Takashi Ichimori, Tokyo (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 949 days.

(21) Appl. No.: 13/590,610

(22) Filed: Aug. 21, 2012

(65) Prior Publication Data

US 2013/0049927 A1 Feb. 28, 2013

(30) Foreign Application Priority Data

Aug. 23, 2011 (JP) ................... 2011-181925

(51) Int. Cl.
 H04N 5/33 (2006.01)
 G05B 19/02 (2006.01)
 H04B 1/20 (2006.01)

(52) U.S. Cl.
 CPC ....................... *H04B 1/202* (2013.01)

(58) Field of Classification Search
 USPC ............................. 348/164; 340/4.3
 See application file for complete search history.

(56) References Cited

U.S. PATENT DOCUMENTS

2005/0206748 A1* 9/2005 Kato .................. 348/231.99
2009/0051651 A1* 2/2009 Han .................. H04N 21/42221
 345/158
2011/0298909 A1* 12/2011 Ando et al. .................. 348/77
2012/0035799 A1* 2/2012 Ehrmann .................. 701/28

FOREIGN PATENT DOCUMENTS

| JP | 04-123121 A | 4/1992 |
| JP | 2007-013652 A | 1/2007 |
| JP | 2007-054114 A | 3/2007 |
| WO | WO 2011062102 A1 * | 5/2011 |

OTHER PUBLICATIONS

Machine translation of WO 2011062102 A1.*

* cited by examiner

*Primary Examiner* — Christopher S Kelley
*Assistant Examiner* — Ana Picon-Feliciano
(74) *Attorney, Agent, or Firm* — Kubotera & Associates, LLC

(57) ABSTRACT

A remote control device includes a light source for irradiating an instruction beam in a non-visible wave length range, and an operation unit for controlling the light source to irradiate the instruction beam when the operation unit is operated. An instruction beam detection apparatus includes an image capturing unit for capturing an image of the instruction beam irradiated from the light source of the remote control device within a detection range thereof; a storage unit for storing a first image captured with the image capturing unit; and a detection unit for detecting a position of the instruction beam on a second image according to a differential image between the first image stored in the storage unit and the second image newly captured with the image capturing unit.

8 Claims, 11 Drawing Sheets

Instruction beam from remote instruction device

Instruction beam from remote instruction device

INSTRUCTION BEAM DETECTION APPARATUS AND METHOD OF DETECTING INSTRUCTION BEAM

BACKGROUND OF THE PRESENT INVENTION AND RELATED ART STATEMENT

The present invention relates to an instruction beam detection apparatus and a method of detecting an instruction beam. More specifically, the present invention relates to an instruction beam detection apparatus capable of detecting an instruction beam irradiated from a remote control device having a light source for irradiating the instruction beam in a non-visible light wave length range and an operation portion for controlling the light source to irradiate the instruction beam. Further, the present invention relates to a method of detecting an instruction beam applicable to the instruction beam detection apparatus.

In general, a remote control device (a remote controlling device) is provided with a light source for irradiating an infrared light beam, so that the remote control device is capable of remotely controlling an electric device such as a television set, an audio visual device and the like. Further, such a remote control device is provided with a plurality of operation buttons for inputting an instruction (a command) to the electric device.

When an operator operates specific one of the operation buttons, the light source irradiates the infrared light beam having a signal wave shape corresponding to the specific one of the operation buttons. When the electric device receives the infrared light beam, an infrared light sensor regenerates the signal wave shape of the infrared light beam thus received from the remote control device. Accordingly, the electric device recognizes the command transmitted from the remote control device, and performs a process according to the command.

In the remote control device having the configuration described above, when the number of the commands is increased due to an increase in functions of the electric device, it is necessary to increase the number of the operation buttons. As a result, when the remote control device is operated to transmit the commands to the electric device, it is difficult for the operator to recognize the operation buttons necessary for transmitting the commands.

To this end, a conventional technology has been proposed, in which the remote control device is configured to function as a pointing device. For example, Patent Reference 1 has disclosed such a conventional technology. According to Patent Reference 1, instead of the infrared light sensor, an imaging element is provided for capturing an image of an indicator member disposed in a moving object, and a display unit is provided for displaying an image output as well as the indicator member as a cursor.

Patent Reference 2 has disclosed an image display control device. The image display control device controls an image display device to display an operation menu on a liquid crystal display portion thereof. Further, a camera with an infrared light filter is provided for recognizing an infrared light signal transmitted from the remote control device. Further, the image display control device is configured to identify a position of the remote control device in a captured image according to the recognition result of the infrared light signal, so that the position of the remote control device is displayed on the liquid crystal display portion. Accordingly, it is possible to determine an operation specified position of the operation menu.

Patent Reference 3 has disclosed a game operation device. The game operation device is provided with an image capture unit capable of capturing an image in a direction along a longitudinal direction of a housing of the remote control device, so that the image capture unit captures an infrared light beam transmitted from an LED module to obtain an image signal. Accordingly, it is possible to capture an operation signal varying depending on a position or a posture of the remote control device through processing the image signal.

Patent Reference 1: Japanese Patent Publication No. 04-123121
Patent Reference 2: Japanese Patent Publication No. 2007-013652
Patent Reference 3: Japanese Patent Publication No. 2007-054114

FIG. 11 is a graph showing a relationship between an irradiation spectrum intensity (a relative value) and a wave length (an irradiation spectrum intensity characteristic) of sun light, the fluorescent light (white), and LED light, and a relationship between a spectral sensitivity (an absolute value) and the wave length (a spectral sensitivity characteristic) of crystal silicon and a human eye.

As shown in FIG. 11, the infrared light sensor formed of crystal silicon has the spectral sensitivity at a relatively high level relative to near infrared light having a wave length of 940 nm. Further, as presented as the sun light and the fluorescent light (white) in FIG. 11, environmental light such as the sun light and the fluorescent light (white) contains near infrared light having the intensity at a relatively low level. Accordingly, conventionally, the remote control device is provided with the light source formed of an LED for irradiating the LED light as an instruction beam shown in FIG. 11.

As shown in FIG. 11, the LED light contains near infrared light having the intensity at a relatively high level (refer to the LED spectrum in FIG. 11). Accordingly, it is possible to secure a sufficient S/N (noise to signal) ratio relative to the environmental light as a noise component.

Accordingly, in the conventional technology disclosed in Patent References 1 and 2, when the imaging element formed of a CCD or a CMOS is provided for detecting the position of the instruction beam irradiated from the remote control device, it is preferred to use the near infrared light as the instruction beam. In this case, however, when the imaging element detects the position of the instruction beam, the instruction beam is irradiated on only a part of pixels (optical electric conversion cells) among a large number of the pixels disposed on a light receiving surface of the imaging element. Further, the instruction beam does not tend to be stably irradiated on specific ones of the pixels on the light receiving surface. Still further, in many cases, the electric device, that is the target of the remote control of the remote control device, is placed in an environment where environmental light such as the sun light, room illumination, and the like is irradiated on the light receiving surface of the imaging element.

In the conventional technology, when the imaging element captures infrared light, a short wave length cutting filter may be disposed in an optical system for reducing a visible light component. However, as explained above, when the instruction beam is irradiated only on a part of the light receiving surface of the imaging element, or is not stably irradiated on the specific location of the imaging element, even though the short wave length cutting filter is disposed, it is difficult to selectively detect the instruction beam to determine the position or the change thereof. Further, in order to improve the S/N ratio relative to the environmental light, the luminous intensity of the instruction beam may be increased. However, in this case, the life of an internal battery of the remote control device tends to be shortened.

In view of the problems described above, an object of the present invention is to provide an instruction beam detection apparatus and a method of detecting an instruction beam capable of solving the problems of the conventional instruction beam detection apparatus. In the present invention, when an imaging element of the instruction beam detection apparatus detects a position of the instruction beam, it is possible to detect the position of the instruction beam with a higher degree of accuracy while reducing an influence of the environmental light.

Further objects and advantages of the present invention will be apparent from the following description of the present invention.

SUMMARY OF THE PRESENT INVENTION

In order to attain the objects described above, according to a first aspect of the present invention, a remote control device includes a light source for irradiating an instruction beam in a non-visible wave length range, and an operation unit for controlling the light source to irradiate the instruction beam when the operation unit is operated. A instruction beam detection apparatus includes an image capturing unit for capturing an image of the instruction beam irradiated from the light source of the remote control device within a detection range thereof; a storage unit for storing a first image captured with the image capturing unit; and a detection unit for detecting a position of the instruction beam on a second image according to a differential image between the first image stored in the storage unit and the second image newly captured with the image capturing unit.

According to the first aspect of the present invention, the remote control device including the light source for irradiating the instruction beam in the non-visible wave length range and the operation unit for controlling the light source to irradiate the instruction beam is used. It is noted that the wave length range of the instruction beam may be preferably an infrared light range near 940 nm. As far as the image capturing unit is capable of obtaining a sufficient S/N ratio relative to background, the wave length range of the instruction beam is not limited thereto. When the operation unit of the remote control device is operated, the image capturing unit captures the first image and the second image of the instruction beam irradiated from the light source of the remote control device within the detection range thereof.

According to the first aspect of the present invention, the storage unit stores the first image captured with the image capturing unit. The detection unit detects the position of the instruction beam on the second image according to the differential image between the first image stored in the storage unit and the second image newly captured with the image capturing unit. Accordingly, when there is a difference in the instruction beam irradiated from the light source of the remote control device between the first image and the second image, and environmental light within the detection range is in the same or a similar luminous state, it is possible to eliminate an image portion corresponding to the environmental light on the differential image, or significantly reduce brightness of the image portion corresponding to the environmental light.

Accordingly, only an image portion corresponding to the instruction beam remains on the differential image, and brightness of the image portion corresponding to the instruction beam is relatively enhanced. As a result, it is possible to accurately detect a position of the image portion corresponding to the instruction beam (a position of the instruction beam). In other words, in the configuration in which the image capturing unit detects the position of the instruction beam, it is possible to reduce an influence of the environmental light and improve detection accuracy of the instruction beam.

According to the first aspect of the present invention, when the image capturing unit detects the position of the instruction beam, one of the first image and the second image does not have the image portion corresponding to the instruction beam, and the other of the first image and the second image does have the image portion corresponding to the instruction beam. To this end, an additional detection unit may be provided for detecting whether the light source of the remote control device irradiates the instruction beam or not. In this case, when the additional detection unit detects that the light source of the remote control device does not irradiate the instruction beam, the image capturing unit captures the first image to be stored in the storage unit. When the additional detection unit detects that the light source of the remote control device does irradiate the instruction beam, the image capturing unit captures the second image.

According to the first aspect of the present invention, even if the additional detection unit is not provided, when the light source of the remote control device is configured to flash, so that the instruction beam is irradiated intermittently, the image capturing unit may be configured to continuously capture the first image and the second image in a cycle shorter than the flashing of the light source of the remote control device. In this case, the image capturing unit captures the first image before a specific cycle, and captures the second image in the specific cycle. Accordingly, when the image portion corresponding to the instruction beam appears on the differential image, the position of the instruction beam is detected.

According to a second aspect of the present invention, in the instruction beam detection apparatus according to the first aspect, when the image captured with the image capturing unit is used as the first image in a state that the instruction beam is not irradiated from the light source of the remote control device, the instruction beam detection apparatus may preferably further include an image updating unit for controlling the image capturing unit to periodically capture the image in the state that the instruction beam is not irradiated from the light source of the remote control device, and for controlling the storage unit to overwrite and store the image thus captured as the first image.

According to the second aspect of the present invention, with the configuration described above, even when an luminous state of the environmental light in the detection range is varied depending on, for example, an variance in the sun light (an intensity, an incident angle, and the like of the sun light) and switching on-off of an interior illumination, it is possible to prevent the detection accuracy of the instruction beam from deteriorating due to the influence of the variance in the luminous state of the environmental light.

According to a third aspect of the present invention, in the instruction beam detection apparatus according to the first aspect or the second aspect, the instruction beam detection apparatus may preferably further include a filter unit for attenuating light in at least one of the short wave length range and the long wave length range relative to the wave length range of the instruction beam among the light irradiated on the image capturing unit. Accordingly, it is possible to attenuate the light in the wave length range that does not contribute the detection of the instruction beam with the filter unit among the light irradiated on the image capturing unit, thereby further improving the detection accuracy of the instruction beam.

According to a fourth aspect of the present invention, a remote control device includes a light source for irradiating an instruction beam in a non-visible wave length range, and an operation unit for controlling the light source to intermittently irradiate the instruction beam in an illumination cycle specified in advance when the operation unit is operated. A instruction beam detection apparatus includes an image capturing unit having a global shutter for capturing an image of the instruction beam intermittently irradiated from the light source of the remote control device within a detection range thereof at a timing instructed externally with the global shutter; a filter unit for attenuating light in at least one of a short wave length range and a long wave length range relative to a wave length range of the instruction beam among the light irradiated on the image capturing unit; a control unit for detecting the illumination cycle of the instruction beam according to the image captured with the image capturing unit so that the image capturing unit is controlled to capture the image at a timing synchronized with an irradiation timing of the instruction beam irradiated from the light source; and a detection unit for detecting a position of the instruction beam on a third image according to the third image captured with the image capturing unit in a state that the control unit controls the image capturing unit to capture the third image at a controlled image capturing timing.

According to the fourth aspect of the present invention, the remote control device includes the light source for irradiating the instruction beam in the non-visible wave length range, and the operation unit for controlling the light source to intermittently irradiate the instruction beam in the illumination cycle set in advance.

According to the fourth aspect of the present invention, the remote control device includes the global shutter. When the operation unit of the remote control device is operated, the image capturing unit captures the image of the instruction beam intermittently irradiated from the light source of the remote control device within the detection range thereof at the timing instructed externally with the global shutter. Further, the instruction beam detection apparatus includes the filter unit for attenuating the light in at least one of the short wave length range and the long wave length range relative to the wave length range of the instruction beam among the light irradiated on the image capturing unit.

According to the fourth aspect of the present invention, the instruction beam detection apparatus further includes the control unit for detecting the illumination cycle of the instruction beam according to the image captured with the image capturing unit so that the image capturing unit is controlled to capture the image at the timing synchronized with an irradiation timing of the instruction beam irradiated from the light source. Further, the instruction beam detection apparatus includes the detection unit for detecting the position of the instruction beam on the third image according to the third image captured with the image capturing unit in the state that the control unit controls the image capturing unit to capture the third image at the controlled image capturing timing.

According to the fourth aspect of the present invention, the light source of the remote control device is configured to intermittently irradiate the instruction beam. Accordingly, as opposed to the case that the light source continuously irradiates the instruction beam, when the light source irradiates the instruction beam, it is possible to increase the intensity of the instruction beam without deteriorating power consumption. Further, the instruction beam detection apparatus includes the filter unit, so that it is possible to attenuate the light in the wave length range that does not contribute to the detection of the instruction beam among the light irradiated on the image capturing unit.

According to the fourth aspect of the present invention, the control unit controls the image capturing unit to capture the image at the timing synchronized with the irradiation timing of the instruction beam irradiated from the light source. Accordingly, the image capturing unit captures the third image under the control, so that it is possible to obtain the image as the third image in which brightness of the image portion corresponding to the environmental light is significantly reduced relative to the image portion corresponding to the instruction beam. As a result, when the detection unit detects the position of the instruction beam on the third image, it is possible to improve the detection accuracy of the instruction beam while reducing the influence of the environmental light in the configuration, in which the detection unit detects the position of the instruction beam.

According to a fifth aspect of the present invention, in the instruction beam detection apparatus according to the fourth aspect, the light source of the remote control device may be preferably configured to intermittently irradiate the instruction beam in the illumination cycle adjusted such that a cumulative intensity of light in a wave length range different from that of the instruction beam becomes smaller than a specific value within one cycle during which the image capturing unit captures the third image.

As described above, according to the fourth aspect of the present invention, the image capturing unit captures the image at the timing synchronized with the irradiation timing of the instruction beam irradiated from the light source of the remote control device. Accordingly, the cumulative intensity of the light in the wave length range different from that of the instruction beam in the one cycle of image capturing varies depending on the irradiation timing of the instruction beam irradiated from the light source of the remote control device.

According to the fifth aspect of the present invention, the irradiation timing of the instruction beam irradiated from the light source of the remote control device is adjusted. Accordingly, it is possible to change the cumulative intensity of the light in the wave length range different from that of the instruction beam in the one cycle of image capturing, that is, the brightness of the image portion corresponding to the environmental light on the third image. When the irradiation timing of the instruction beam irradiated from the light source of the remote control device is adjusted such that the brightness of the image portion corresponding to the environmental light on the third image is decreased, it is possible to further improve the detection accuracy of the instruction beam.

According to a sixth aspect of the present invention, in the instruction beam detection apparatus according to one of the first aspect to the fifth aspect, the detection unit may be preferably configured to trace a change in the position of the instruction beam on the second image or the third image after the detection unit detects the position of the instruction beam on the second image or the third image, so that the detection unit continuously outputs the change in the position of the instruction beam.

According to the sixth aspect of the present invention, when the user holding the remote control device changes a direction of the remote control device such that the irradiation direction of the instruction beam from the light source of the remote control device is changed, and performs an operation such that the position of the instruction beam on the second image or the third image is changed, the detection unit detects the position of the instruction beam after the change. Accordingly, it is possible to make the remote control device function as a pointing device. Further, it is possible to realize a user interface on which a position of a cursor displayed on a display device is changed according to the change in the irradiation direction of the remote control device (the position of the instruction beam on the second image or the third image).

According to a seventh aspect of the present invention, in the instruction beam detection apparatus according to one of the first aspect to the sixth aspect, the remote control device may be configured to have a plurality of light sources emitting light simultaneously. The instruction beam detection apparatus may include the detection unit for detecting positions of a plurality of instruction beams irradiated from the light sources. Further, the detection unit is configured to detect an angle of the remote control device around an axis crossing a direction along which the light sources are arranged according to a positional relationship of each of the instruction beams thus detected.

According to the seventh aspect of the present invention, it is possible to make the remote control device function as the pointing device. Further, it is possible to realize the user interface on which the position of the cursor displayed on the display device is changed according to the angle of the remote control device around the axis crossing the direction along which the light sources are arranged.

According to an eighth aspect of the present invention, in the instruction beam detection apparatus according to one of the first aspect to the seventh aspect, the detection unit may be configured to divide the differential image or the third image into a plurality of divided regions, so that the detection unit detects the position of the instruction beam in each of the divided regions as unit. Further, the detection unit may be configured to divide the differential image or the third image into the divided regions each having an outer peripheral edge defined such that one of the divided regions is partially overlapped with an adjacent divided region.

According to the eighth aspect of the present invention, the detection unit sequentially detects the position of the instruction beam in each of the divided regions as unit. Accordingly, it is possible to reduce a capacity of a work memory and the like, thereby making the configuration of the instruction beam detection apparatus simple.

According to a ninth aspect of the present invention, in the instruction beam detection apparatus according to the eighth aspect, the detection unit may be configured to store a position detection result of the instruction beam in each of the divided regions as a history, so that the detection unit detects the position of the instruction beam in each of the divided regions as unit according to an order of a position detection frequency of the instruction beam in each of the divided regions indicated in the history.

In general, the instruction beam tends to be irradiated only on a part of the light receiving surface of the image capturing unit, or be not stably irradiated on a specific location of the light receiving surface of the image capturing unit. Accordingly, the position detection frequency of (the position of) the instruction beam in each of the divided regions tends to vary.

According to the ninth aspect of the present invention, the detection unit detects the position of the instruction beam in each of the divided regions as unit according to the order of the position detection frequency of the instruction beam in each of the divided regions indicated in the history. Accordingly, it is possible to detect the position of the instruction beam more quickly.

According to a tenth aspect of the present invention, in the instruction beam detection apparatus according to the third aspect or the fourth aspect, when the instruction beam is light in an infrared light range, the filter unit may be preferably configured to attenuate light in a wave length range on a short wave length side relative to the infrared light range, that is, light in a visible light range, among the light irradiated on the image capturing unit.

According to the tenth aspect of the present invention, the light irradiated on the image capturing unit tends to have the intensity in the wave length range on the short wave length side relative to the infrared light range greater than the intensity in the wave length range on the long wave length side relative to the infrared light range. Accordingly, when the filter unit is configured to attenuate the light in the wave length range on the short wave length side relative to the infrared light range, it is possible to efficiently improve the detection accuracy of the instruction beam.

According to an eleventh aspect of the present invention, in the instruction beam detection apparatus according to the tenth aspect, the filter unit may be preferably configured to be a band filter having a characteristic for attenuating light in a wave length range on a long wave length side relative to the infrared light range among the light irradiated on the image capturing unit. According, it is possible to further improve the detection accuracy of the instruction beam.

According to a twelfth aspect of the present invention, a method of detecting an instruction beam includes the steps of capturing a first image and a second image of the instruction beam irradiated from a light source of a remote control device within a detection range thereof with an image capturing unit when an operation unit of the remote control device is operated, said remote control device including the light source for irradiating the instruction beam in a non-visible wave length range and the operation unit for controlling the light source to irradiate the instruction beam; storing the first image captured with the image capturing unit in a storage unit; and detecting a position of the instruction beam on the second image with a detection unit according to a differential image between the first image stored in the storage unit and the second image newly captured with the image capturing unit.

According to the twelfth aspect of the present invention, similar to the first aspect of the present invention, in the configuration in which the image capturing unit detects the position of the instruction beam, it is possible to reduce the influence of the environmental light and improve the detection accuracy of the instruction beam.

According to a thirteenth aspect of the present invention, a method of detecting an instruction beam includes the steps of capturing an image of the instruction beam intermittently irradiated from a light source of a remote control device within a detection range thereof at a timing instructed externally with an image capturing unit having a global shutter when an operation unit of the remote control device is operated, said remote control device including the light source for irradiating the instruction beam in a non-visible wave length range and the operation unit for controlling the light source to intermittently irradiate the instruction beam in an illumination cycle specified in advance; attenuating light with a filter unit in at least one of a short wave length range and a long wave length range relative to a wave length range of the instruction beam among the light irradiated on the image capturing unit; detecting the illumination cycle of the instruction beam with a control unit according to the image captured with the image capturing unit so that the image capturing unit is controlled to capture the image at a timing synchronized with an irradiation timing of the instruction beam irradiated from the light source; and detecting a position of the instruction beam on a third image with a detection unit according to the third image captured with the image capturing unit in a state that the control unit controls the image capturing unit to capture the third image at a controlled image capturing timing.

According to the thirteenth aspect of the present invention, similar to the fourth aspect of the present invention, in the configuration in which the image capturing unit detects the position of the instruction beam, it is possible to reduce the influence of the environmental light and improve the detection accuracy of the instruction beam.

As described above, in the instruction beam detection apparatus according to the present invention, the storage unit is configured to store the first image captured with the image capturing unit. Further, the detection unit is configured to detect the position of the instruction beam on the second image according to the differential image between the first image stored in the storage unit and the second image newly captured with the image capturing unit in the state that the instruction beam is irradiated from the light source of the remote control device when the operation unit of the remote control device is operated. Accordingly, in the configuration in which the image capturing unit detects the position of the instruction beam, it is possible to reduce the influence of the environmental light and improve the detection accuracy of the instruction beam.

Further, in the instruction beam detection apparatus according to the present invention, the image capturing unit is configured to capture the image of the instruction beam irradiated intermittently irradiated from the light source of the remote control device in the illumination cycle specified in advance within the detection range thereof at the timing instructed externally with the global shutter. Further, the control unit is configured to detect the illumination cycle of the instruction beam according to the image captured with the image capturing unit, so that the image capturing unit is controlled to capture the image at the timing synchronized with the irradiation timing of the instruction beam irradiated from the light source. Further, the detection unit is configured to detect the position of the instruction beam on the third image according to the third image captured with the image capturing unit in the state that the control unit controls the image capturing unit to capture the third image at the controlled image capturing timing. Accordingly, in the configuration in which the image capturing unit detects the position of the instruction beam, it is possible to reduce the influence of the environmental light and improve the detection accuracy of the instruction beam.

BRIEF DESCRIPTION OF THE DRAWINGS

FIGS. 4(A) to 4(C) are photographic views showing examples of images of the infrared light position detection apparatus according to the first embodiment of the present invention, wherein FIG. 4(A) is a photographic view showing an example of a background image, FIG. 4(B) is a photographic view showing an example of an image captured with a CMOS imaging element of the infrared light position detection apparatus, and FIG. 4(C) is a photographic view showing an example of a differential image;

FIGS. 6(A) and 6(B) are schematic views showing examples of images of the infrared light position detection apparatus according to the second embodiment of the present invention, wherein FIG. 6(A) is a schematic view showing an example of an original image and FIG. 6(B) is a schematic view showing an example of divided regions divided from the original image;

FIGS. 10(A) and 10(B) are photographic views showing examples of images of the infrared light position detection apparatus according to the third embodiment of the present invention, wherein FIG. 10(A) is a photographic view showing an example of an image captured through a visible light cut filter and FIG. 10(B) is a photographic view showing an example of an image captured through the near infrared light transmission band pass filter of the infrared light position detection apparatus.

DETAILED DESCRIPTION OF PREFERRED EMBODIMENTS

Hereunder, preferred embodiments of the present invention will be explained with reference to the accompanying drawings.

First Embodiment

Figure 1:
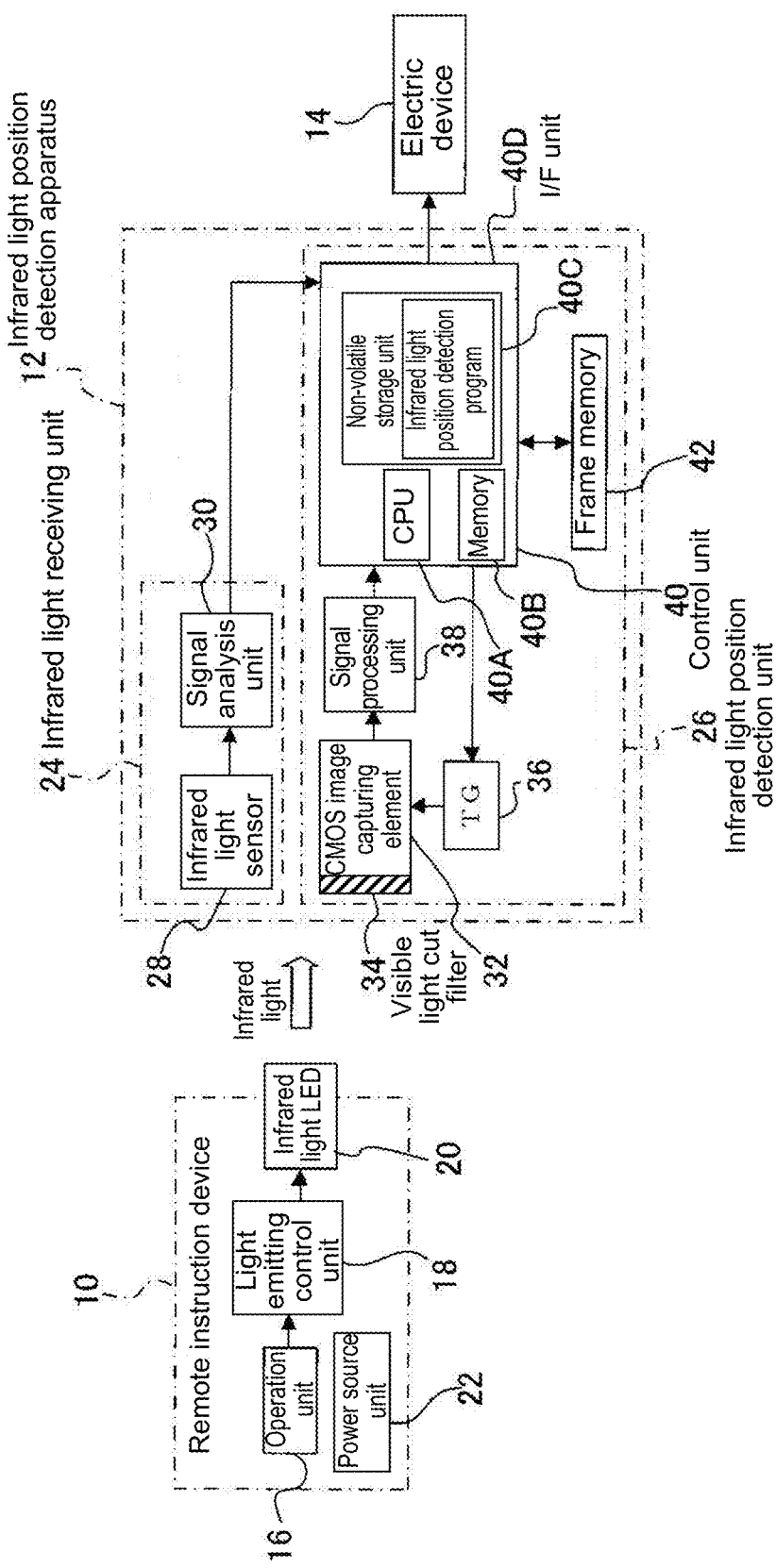
FIG. 1 is a block diagram showing a configuration of an infrared light position detection apparatus and a remote control device according to a first embodiment of the present invention.

A first embodiment of the present invention will be explained. FIG. 1 is a block diagram showing a configuration of an infrared light position detection apparatus 12 and a remote instruction device 10 in addition to an electric device 14 to be an object of remote control according to the first embodiment of the present invention. It is noted that the electric device 14 may include various electric devices such as a television set, an audio visual (AV) device, a personal computer (PC), an air conditioner, and the like.

In the embodiment, the remote instruction device 10 is configured to be an instruction device, or so-called a remote control device, to be operated by a user holding the remote instruction device 10 to remotely control the electric device 14. As shown in FIG. 1, the remote instruction device 10 includes an operation unit 16, a light emitting control unit 18, an infrared light LED (Light Emitting Diode) 20, and a power source unit 22.

In the embodiment, the operation unit 16 is provided with more than one button for the user holding the remote instruction device 10 to perform an operation to instruct the infrared light LED 20 to irradiate infrared light (an instruction beam). Further, the light emitting control unit 18 is connected to the operation unit 16 and the infrared light LED 20. When the user performs the operation through the operation unit 16 to instruct the infrared light LED 20 to irradiate infrared light (the instruction beam), the infrared light LED 20 irradiates infrared light (the instruction beam).

Figure 2:
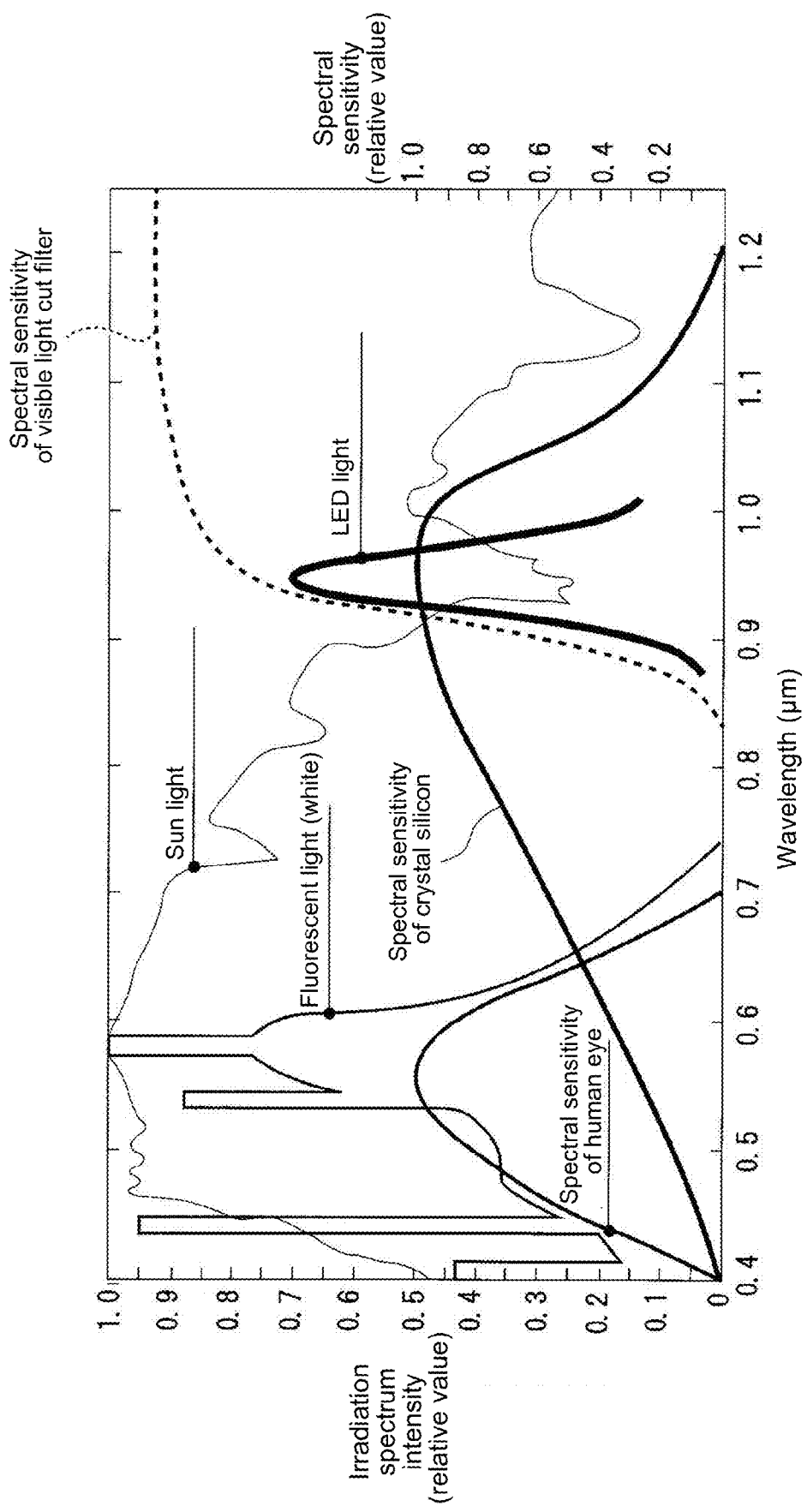
FIG. 2 is a graph showing a relationship between an irradiation spectrum intensity (a relative value) and a wave length (an irradiation spectrum intensity characteristic) of sun light, fluorescent light (white), and LED light, and a relationship between a spectral sensitivity (an absolute value) and the wave length (a spectral sensitivity characteristic) of crystal silicon, a human eye, and a visible light cut filter of the infrared light position detection apparatus according to the first embodiment of the present invention.

In the embodiment, infrared light (the instruction beam) irradiated from the infrared light LED 20 includes near infrared light (refer to "LED spectrum" shown in FIG. 2). The power source unit 22 is provided for supplying electrical power to components including the infrared light LED 20 from a battery installed in the remote instruction device 10. It should be noted that the infrared light LED 20 corresponds to an example of a light source in the present invention, and the operation unit 16 corresponds to an example of an operation unit of the present invention.

As shown in FIG. 1, the infrared light position detection apparatus 12 includes an infrared light receiving unit 24 and an infrared light position detection unit 26. The infrared light receiving unit 24 includes an infrared light sensor 28 and a signal analysis unit 30. The infrared light receiving unit 24 is configured to be an infrared light receiving device for receiving infrared light having different wave shapes according to a command.

In the embodiment, the signal analysis unit 30 is configured to determine whether infrared light (the instruction beam) irradiated from the infrared light LED 20 of the remote instruction device 10 is contained in infrared light detected with the infrared light sensor 28. When the signal analysis unit 30 determines that the instruction beam is contained in infrared light detected with the infrared light sensor 28, the signal analysis unit 30 analyzes a signal wave shape of the instruction beam to interpret a command thereof, so that the signal analysis unit 30 outputs an analysis result of the signal wave shape and an interpretation result of the command.

As shown in FIG. 1, the infrared light position detection unit 26 includes a CMOS image capturing element 32, a visible light cut filter 34, a timing generator (TG) 36, a signal processing unit 38, a control unit 40, and a frame memory 42. The CMOS image capturing element 32 includes a plurality of optical electrical conversion cells arranged on a light receiving surface thereof in a matrix pattern. An orientation direction of the light receiving surface of the CMOS image capturing element 32 is adjusted such that the CMOS image capturing element 32 captures an image in a detection range of infrared light irradiated from the infrared light LED 20 of the remote instruction device 10. It should be noted that the CMOS image capturing element 32 corresponds to an example of an image capturing unit of the present invention.

In the embodiment, the visible light cut filter 34 is disposed in front of the light receiving surface of the CMOS image capturing element 32, and has a spectrum transmission characteristic shown in FIG. 2.

FIG. 2 is a graph showing a relationship between an irradiation spectrum intensity (a relative value) and a wave length (an irradiation spectrum intensity characteristic) of sun light, fluorescent light (white), and LED light, and a relationship between a spectral sensitivity (an absolute value) and the wave length (a spectral sensitivity characteristic) of crystal silicon, a human eye, and the visible light cut filter 34 of the infrared light position detection apparatus 12 according to the first embodiment of the present invention.

As shown in FIG. 2, the visible light cut filter 34 is configured to attenuate light (mainly visible light) on a short wave length side below 900 nm. The visible light cut filter 34 may include, for example, the IR-90 filter (a product of FUJIFILM Corporation). It should be noted that the visible light cut filter 34 corresponds to an example of a filter unit of the present invention. The TG 36 is configured to generate a clock signal for defining a timing of an image capturing operation of the CMOS image capturing element 32, so that the TG 36 transmits the clock signal thus generated to the CMOS image capturing element 32.

In the embodiment, the signal processing unit 38 includes an amplifier unit and an A/D conversion unit, so that the signal processing unit 38 amplifies an image signal output from the CMOS image capturing element 32 and converts the image signal to digital image data. The control unit 40 includes a CPU (Central Processing Unit) 40A, a memory 40B, a non-volatile storage unit 40C, and an I/F (an interface) unit 40D. The I/F unit 40D is connected to the infrared light receiving unit 24 and the electric device 14. The storage unit 40C is provided for storing an infrared light position detection program for performing an infrared light position detection process performed with the CPU 40A (described later).

In the embodiment, in the infrared light position detection process, the control unit 40 is configured to detect a position of infrared light irradiated from the infrared light LED 20 of the remote instruction device 10 on an image, and output a detection result to the electric device 14. Further, the infrared light position detection unit 26 includes a frame memory 42 connected to the control unit 40 for storing the image data input to the control unit 40 from the CMOS image capturing element 32 through the signal processing unit 38. It should be noted that the frame memory 42 corresponds to an example of a storage unit of the present invention.

Figure 3:
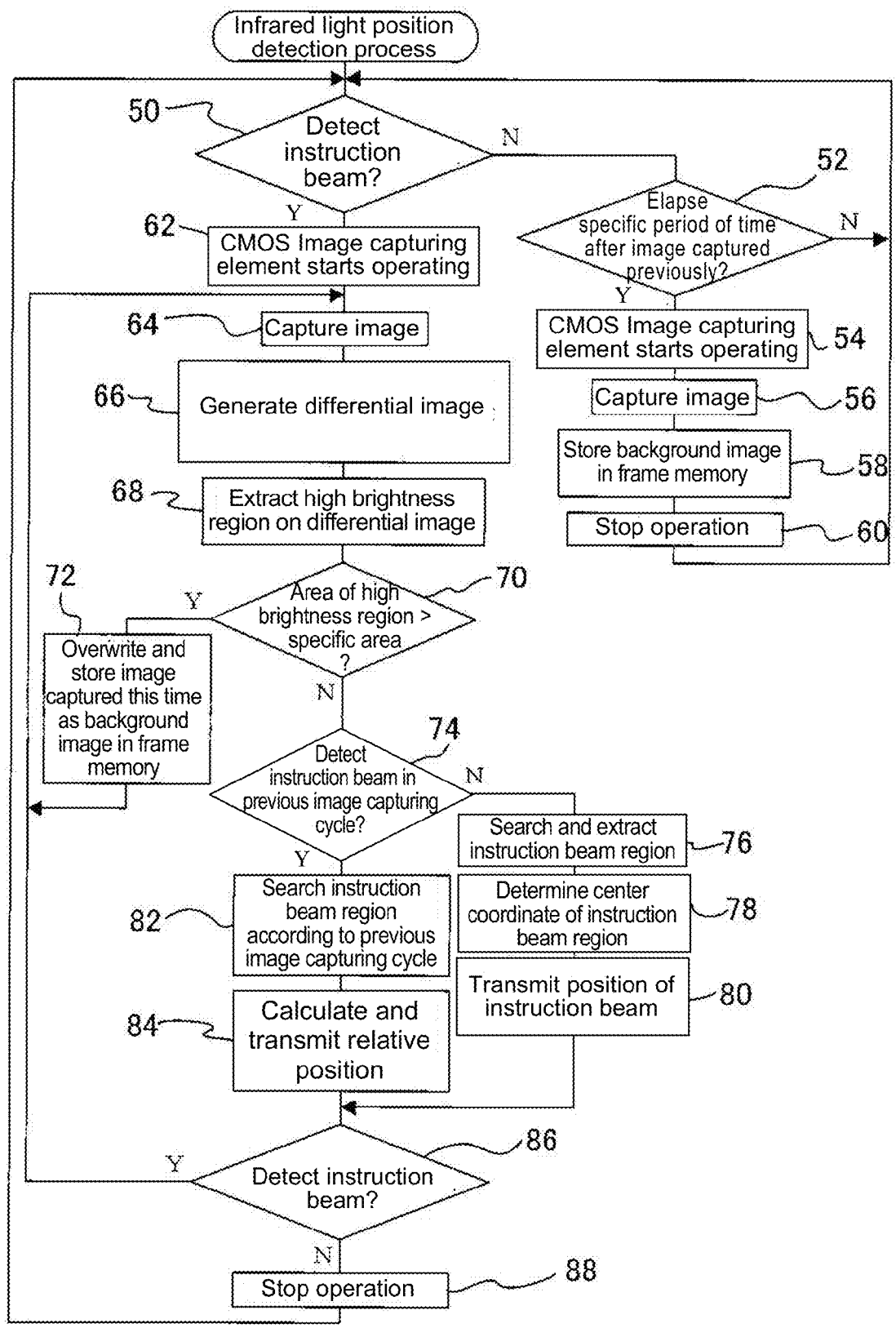
FIG. 3 is a flow chart showing an operation of the infrared light position detection apparatus in an infrared light position detection process according to the first embodiment of the present invention.

An operation of the infrared light position detection apparatus 12 will be explained next with reference to FIG. 3. In the operation, the control unit 40 of the infrared light position detection unit 26 performs an infrared light position detection process all the time. FIG. 3 is a flow chart showing the operation of the infrared light position detection apparatus 12 in the infrared light position detection process according to the first embodiment of the present invention. It should be noted that the control unit 40 corresponds to an example of a detection unit of the present invention for performing the infrared light position detection process.

In step 50, the control unit 40 determines whether the infrared light sensor 28 detects the instruction beam (infrared light irradiated from the infrared light LED 20 of the remote instruction device 10) according to the signal received from the infrared light receiving unit 24. In the remote instruction device 10, when the user instructs to irradiate the instruction beam through the operation unit 16, the infrared light LED 20 irradiates the instruction beam. Accordingly, when the user does not operate the operation unit 16 of the remote instruction device 10, the control unit 40 determines that the infrared light sensor 28 does not detect the instruction beam in step 50, and the process proceeds to step 52.

In the embodiment, when the infrared light position detection process is performed, the CMOS image capturing element 32 captures the image in the state that the infrared light LED 20 of the remote instruction device 10 does not irradiate the instruction beam. Then, the image captured with the CMOS image capturing element 32 is stored in the frame memory 42 as a background image.

In step 52, the control unit 40 determines whether a specific period of time is elapsed after the CMOS image capturing element 32 previously captured the image (a previous image) that was stored in the frame memory 42 as the background image. When the control unit 40 determines that the specific period of time is not elapsed yet, the process returns to step 50, so that step 50 and step 52 are repeated. When the control unit 40 determines that the specific period of time is elapsed in step 52, the process proceeds to step 54.

In step 54, the control unit 40 starts supplying power to the CMOS image capturing element 32 and the TG 36 starts transmitting the clock signal to the CMOS image capturing element 32, so that the CMOS image capturing element 32 starts operating. In step 56, the control unit 40 controls the CMOS image capturing element 32 to capture the image to be stored in the frame memory 42 as the background image. In step 58, after the CMOS image capturing element 32 captures the image, the control unit 40 controls the frame memory 42 to stores image data of the image transmitted through the signal processing unit 38. Accordingly, the background image is stored in the frame memory 42 as shown FIG. 4(A) as an example. It should be noted that when image data of the background image is already stored in the frame memory 42, the control unit 40 overwrites the image data of the background image previously stored with the image data of the background image captured this time, so that the image data of the background image captured this time is stored in the frame memory 42.

In step 60, the control unit 40 stops supplying power to the CMOS image capturing element 32 and the TG 36 stops transmitting the clock signal to the CMOS image capturing element 32, so that the CMOS image capturing element 32 stops operating. After the control unit 40 performs the operation in step 60, the process returns to step 50. Accordingly, when the infrared light LED 20 of the remote instruction device 10 does no irradiate the instruction beam, the CMOS image capturing element 32 captures the image periodically every the specific period of time. As a result, the background image stored in the frame memory 42 is continuously updated with the image newly captured with the CMOS image capturing element 32. Further, it should be noted that the control unit 40 controls the CMOS image capturing element 32 to stop operating when the infrared light LED 20 of the remote instruction device 10 does not irradiate the instruction beam and the CMOS image capturing element 32 does not capture the image. Accordingly, it is possible to reduce power consumption of the CMOS image capturing element 32.

In the embodiment, the process from step 52 to step 60 corresponds to a process performed with an image updating unit of the present invention. It should be noted that the control unit 40 is configured to function as the image updating unit.

In the embodiment, when the user operates the operation unit 16 of the remote instruction device 10, the infrared light LED 20 of the remote instruction device 10 irradiates the instruction beam. When the control unit 40 determines that the infrared light sensor 28 detects the instruction beam irradiated from the infrared light LED 20 of the remote instruction device 10 in step 50, the process proceeds to step 62. In step 62, the control unit 40 starts supplying power to the CMOS image capturing element 32 and the TG 36 starts transmitting the clock signal to the CMOS image capturing element 32, so that the CMOS image capturing element 32 starts operating. In step 64, the control unit 40 controls the CMOS image capturing element 32 to capture the image. It should be noted that image captured with the CMOS image capturing element 32 at this time is referred to as a real time image in the following description.

In step 66, the control unit 40 calculates a difference in brightness between the real time image captured this time and the background image stored in the frame memory 42, so that the control unit 40 generates a differential image.

In the embodiment, the control unit 40 generates the differential image through calculating using the following equations:

$$Id = Ir - Ib \text{ (when } Ir > Ib\text{)}$$

$$Id = Ib - Ir \text{ (when } Ir < Ib\text{)}$$

where Ir is brightness of a pixel corresponding to the real time image, Ib is brightness of a pixel corresponding to the background image, and Id is brightness of a pixel corresponding to the differential image.

Accordingly, it is possible to obtain the differential image, in which only pixel having brightness in the real time image greater than that in the background image (Id>0) is displayed. As a result, even when there is a pixel in the real time image having brightness smaller than that in the background due to a cause such as blocking of the user, it is possible to make brightness of the pixel in the real time image zero.

Figure 4A:
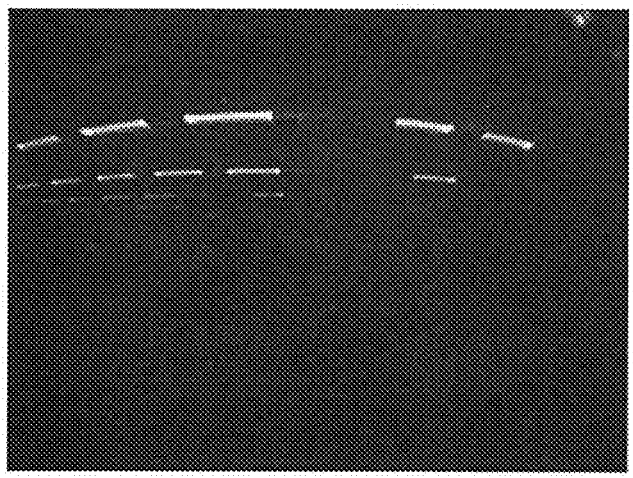
Figure 4B:
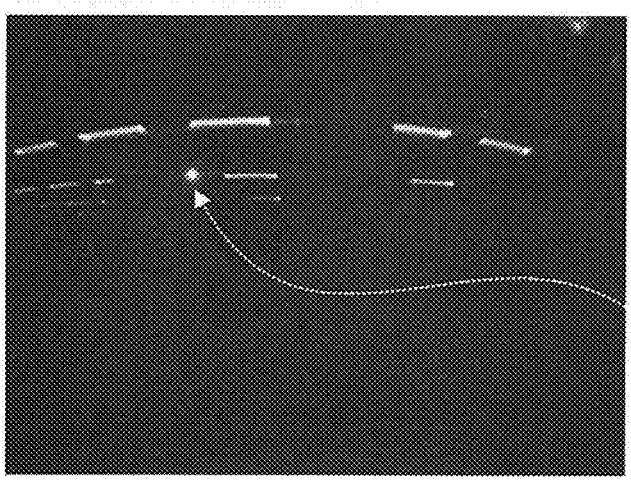
Figure 4C:
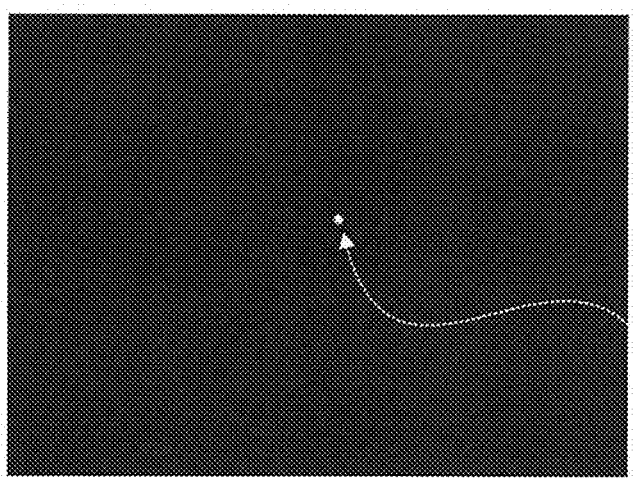

FIGS. 4(A) to 4(C) are photographic views showing examples of the images of the infrared light position detection apparatus 12 according to the first embodiment of the present invention. More specifically, FIG. 4(A) is a photographic view showing an example of the background image, FIG. 4(B) is a photographic view showing an example of the real time image captured with the CMOS imaging element 32 of the infrared light position detection apparatus 12, and FIG. 4(C) is a photographic view showing an example of the differential image. As shown in FIG. 4(C), it is possible to obtain the differential image, in which only a region corresponding to the instruction beam irradiated from the remote instruction device 10 has brightness (is displayed).

In step 68, the control unit 40 compares brightness of each of the pixels on the differential image generated in step 66 with a specific value, so that the control unit 40 extracts a high brightness region having brightness greater than the specific value on the differential image.

In step 70, the control unit 40 determines an area (for example, the number of the pixels) of the high brightness region extracted in step 68. Then, the control unit 40 determines whether the area thus determined is greater than a specific area defined in advance. When the control unit 40 determines that the area thus determined is not greater than the specific area defined in advance in step 70, the process proceeds to step 74.

In step 74, the control unit 40 determines whether the instruction beam (the instruction beam region) is detected when the CMOS image capturing element 32 captured the image in one image capturing cycle before (a previous image capturing cycle). When the CMOS image capturing element 32 captures the image for the first time after the control unit 40 determines that the infrared light sensor 28 detects the instruction beam in step 50, the control unit 40 determines that the instruction beam (the instruction beam region) is not detected in the previous image capturing cycle, and the process proceeds to step 76.

In step 76, the control unit 40 searches for and extracts a region (the instruction beam region) supposed to correspond to the instruction beam in the high brightness region on the differential image. For example, when the differential image shown in FIG. 4(C) is obtained, the region indicated with "infrared light" from the infrared light LED 20) in FIG. 4(C) is extracted as the instruction beam region. When the high brightness region exists at a plurality of locations on the differential image, the control unit 40 searches for and extracts the region (the instruction beam region) based on the fact that the instruction beam region on the differential image has a circular or a substantially circular shape, and has a size within a constant range as shown in FIG. 4(C).

In step 78, the control unit 40 determines a center coordinate of the instruction beam region searched for and extracted in step 76. In step 80, the control unit 40 transmits the center coordinate of the instruction beam region calculated in step 78 to the electric device 14 as a position of the instruction beam.

When the CMOS image capturing element 32 captures the image for the second time or later after the control unit 40 determines that the infrared light sensor 28 detects the instruction beam in step 50, the control unit 40 determines that the instruction beam (the instruction beam region) is detected in the previous image capturing cycle, and the process proceeds to step 82. In step 82, the control unit 40 defines a search range of the instruction beam region with the position of the instruction beam detected in the previous image capturing cycle of the CMOS image capturing element 32 as the reference. Then, the control unit 40 searches for and extracts the instruction beam region within the search range thus defined.

In step 84, the control unit 40 calculates the central coordinate of the instruction beam region searched for and extracted in step 82. Further, the control unit 40 calculates a relative position of the position of the instruction beam extracted this time relative to the position of the instruction beam in the previous image capturing cycle. Then, in step 84, the control unit 40 transmits the relative position of the position of the instruction beam extracted this time and thus calculated relative to the position of the instruction beam in the previous image capturing cycle to the electric device 14.

In step 86, the control unit 40 determines whether the infrared light sensor 28 detects the instruction beam. When the control unit 40 determines that the infrared light sensor 28 detects the instruction beam in step 86, the process returns to step 64. Accordingly, the process from step 64 to step 86 is repeated until the control unit 40 determines that the infrared light sensor 28 does not detect the instruction beam in step 86. Accordingly, when the user holding the remote instruction device 10 operates and changes an inclination angle of the remote instruction device 10 to change an irradiation direction of the instruction beam from the remote instruction device 10 for remotely controlling the electric device 14, it is possible to detect the change in the position of the instruction beam, so that the detection result is transmitted to the electric device 14 as needed.

In the embodiment, the control unit 40 of the infrared light position detection apparatus 12 is configured to transmit the position detection result to the electric device 14. After the electric device 14 receives the position detection result, the user inputs an instruction to the electric device 14. Accordingly, the electric device 14 performs the following process to switch an operation according to the instruction thus received.

In the embodiment, the electric device 14 is provided with a display unit. When the position of the instruction beam is transmitted to the electric device 14, first, the electric device 14 displays a menu screen on the display unit, in which a plurality of command names that the electric device 14 can accept as selection items and a cursor are arranged at specific positions. In the next step, when the relative position of the instruction beam currently detected relative to the position of the instruction beam input previously is transmitted to the electric device 14, the electric device 14 controls the cursor displayed in the menu screen to move to a specific position according to the relative position thus input.

In the next step, when the cursor is moved to a position corresponding to a displayed position of one of the command names, the electric device 14 determines that the command name matched to the position of the cursor is input, the electric device 14 switches to an operation according to the instruction of the command thus determined. Through the process performed with the electric device 14, the user can input a desired command to the electric device 14 through GUI without performing a cumbersome operation such as selecting a button among a plurality of buttons corresponding to a command to be input to the electric device 14.

In the embodiment, in the process from step 64 to step 86, when the control unit 40 determines that the area thus determined is greater than the specific area defined in advance in step 70, the process proceeds to step 72. When the control unit 40 determines that the area is greater than the specific area, it is possible to a background portion of the real time image is significantly different from the background image due to a cause such as a large change in an illumination condition within the imaging range of the CMOS image capturing element 32.

In Step 72, the control unit 40 overwrites and stores the image captured with the CMOS image capturing element 32 this time as the background image in the frame memory 42, and the process returns to step 64. In this case, the frame memory 42 stores the background image in the state that the instruction beam from the remote instruction device 10 is irradiated. Afterward, when the user holds the remote instruction device 10 in the inclined state to change the irradiation direction of the instruction beam, it is possible to detect the instruction beam region once again.

In the embodiment, when the user stops operating the operation unit 16 of the remote instruction device 10, the infrared light LED 20 of the remote instruction device 10 stops irradiating the instruction beam. Accordingly, in step 86, the control unit 40 determines that the infrared light sensor 28 does not detect the instruction beam, and the process proceeds to step 88. In step 88, the control unit 40 stops the operation of the CMOS image capturing element 32. After the control unit 40 performs the operation in step 88, the process returns to step 50. Accordingly, during a period of time when the remote instruction device 10 does not irradiate the instruction beam, the background image stored in the frame memory 42 is periodically updated.

Second Embodiment

A second embodiment of the present invention will be explained next. It should be noted that the infrared light position detection apparatus 12 in the second embodiment has a configuration similar to that of the infrared light position detection apparatus 12 in the first embodiment. Accordingly, components in the second embodiment similar to those in the first embodiment are designated with the same reference numerals, and explanations thereof are omitted.

Figure 5:
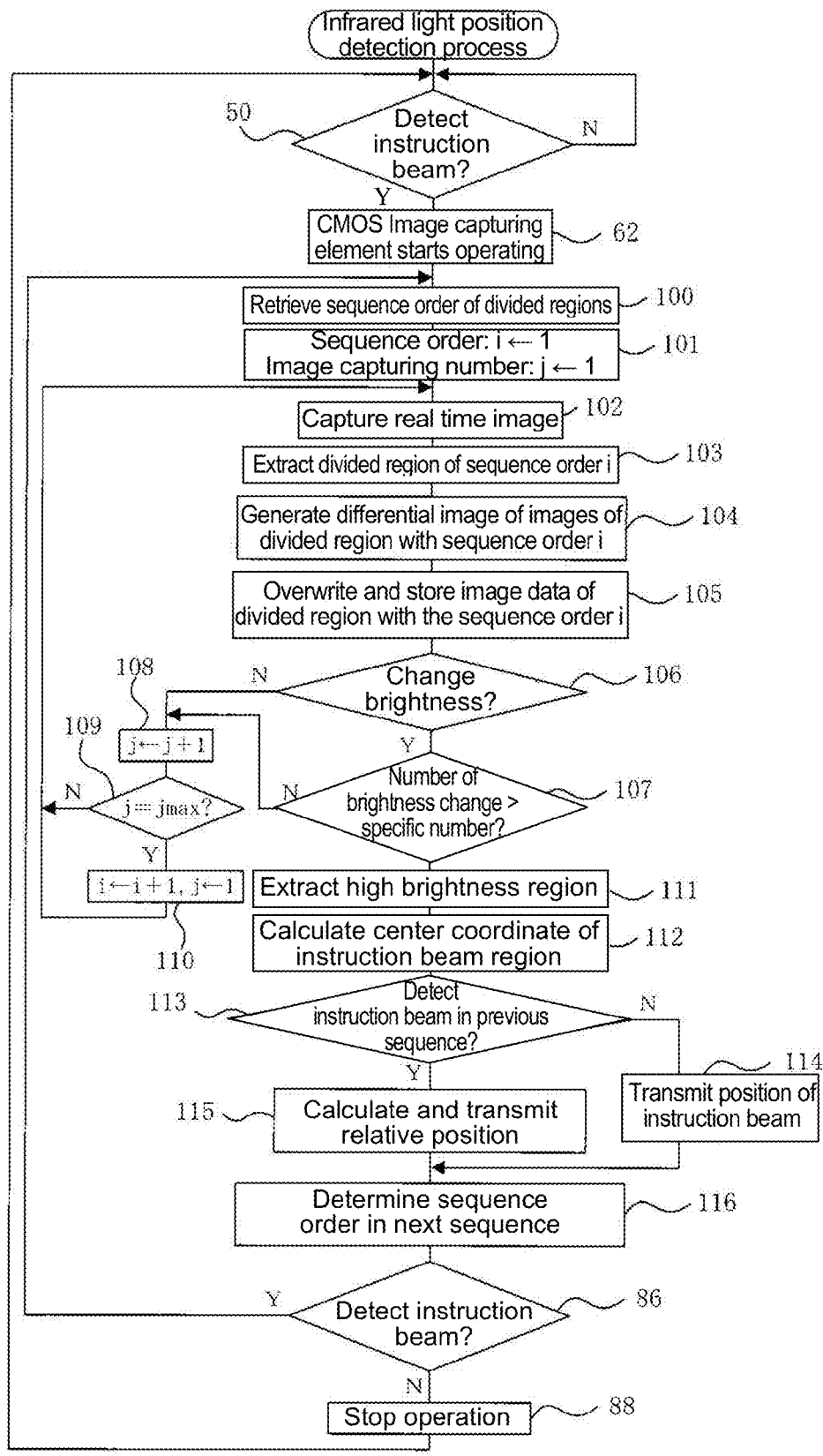
FIG. 5 is a flow chart showing an operation of an infrared light position detection apparatus in an infrared light position detection process according to a second embodiment of the present invention.

An infrared light position detection process according to the second embodiment will be explained next with reference to FIG. 5. FIG. 5 is a flow chart showing an operation of the infrared light position detection apparatus 12 in the infrared light position detection process according to the second embodiment of the present invention.

It should be noted that only a difference from the infrared light position detection process in the first embodiment shown in FIG. 3 will be explained. It also should be noted that the infrared light position detection process according to the second embodiment corresponds to an example of a process performed with a detection unit of the present invention, and the control unit 40 corresponds to an example of the detection unit of the present invention.

In the second embodiment, when the control unit 40 determines that the infrared light sensor 28 of the infrared light receiving unit 24 does not detect the instruction beam in step 50, step 50 is repeated. When the control unit 40 determines that the infrared light sensor 28 does detect the instruction beam in step 50, the process proceeds to step 62. In step 62, the control unit 40 starts supplying power to the CMOS image capturing element 32, so that the CMOS image capturing element 32 starts operating.

Figure 6:
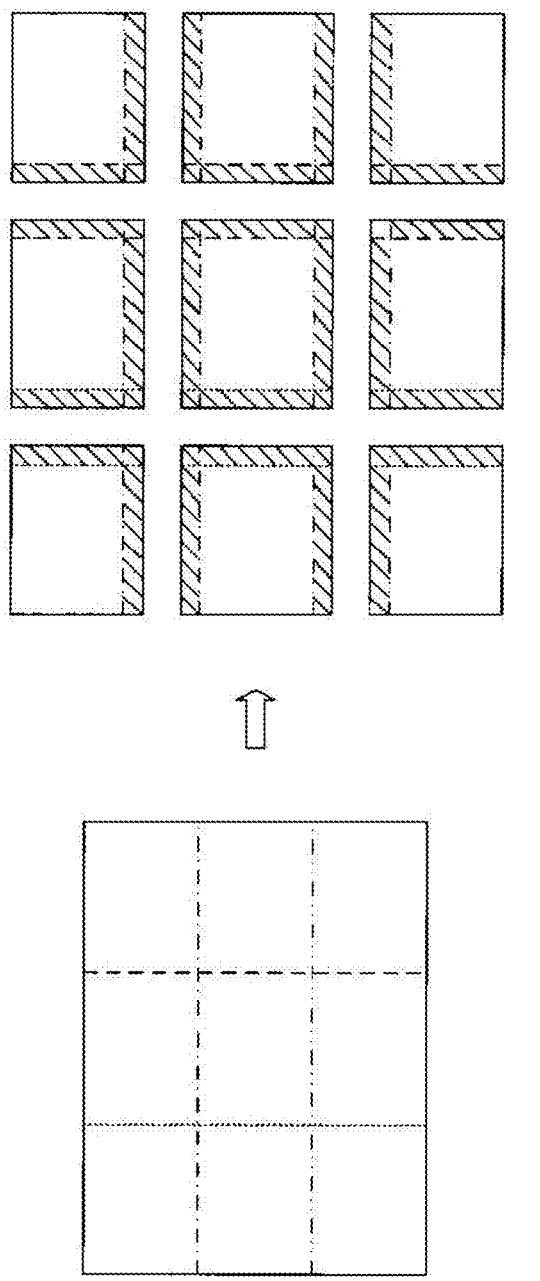

FIGS. 6(A) and 6(B) are schematic views showing examples of images of the infrared light position detection apparatus 12 according to the second embodiment of the present invention. More specifically, FIG. 6(A) is a schematic view showing an example of an original image, and FIG. 6(B) is a schematic view showing an example of divided regions divided from the original image.

As shown in FIGS. 6(A) and 6(B), in the second embodiment, the control unit 40 is configured to divide the original image into the divided regions, so that the control unit 40 generates the differential image and searches the high brightness region and the instruction beam region in each of the divided regions as a unit. Accordingly, in the second embodiment, the frame memory 42 has the capacity capable of storing the image data of the single divided region (that is, the capacity of the frame memory 42 is one N-th of that in the first embodiment, where N is the total number of the divided regions.)

In the second embodiment, as shown in FIG. 6(B), each of the divided regions has an overlapped portion overlapped with other divided regions. It should be noted that the overlapped portion may be omitted. Further, in the second embodiment, each of the divided regions is stored in the memory 40B in a sequence order (a process order) defined in advance. In step 100, the control unit 40 retrieves the sequence order (the process order) of each of the divided regions stored in the memory 40B.

More specifically, in the second embodiment, the control unit 40 is configured to store a frequency (the number) of the previous detections of the instruction beam in each of the divided regions in the storage unit 40C. When the instruction beam (the instruction beam region) is not detected in the sequence of the divided regions one round before, in step 100, the control unit 40 retrieves the sequence order (the process order) defined in advance, so that each of the divided regions is sequenced (processed) according to the sequence order of the frequency of the previous detections of the instruction beam in each of the divided regions.

On the other hand, when the instruction beam (the instruction beam region) is detected in the sequence of the divided regions one round before, in step 100, the control unit 40 retrieves the sequence order (the process order) of each of the divided regions determined in step 116 (described later). In the sequence order (the process order) at this time, a specific one of the divided regions, in which the instruction beam (the instruction beam region) is detected in the sequence order of the divided regions one time before, is sequenced (processed) at first. The sequence order (the process order) at this time is determined such that one of the divided regions is sequenced (processed) in a lower order as a distance of the one of the divided regions from the specific one of the divided regions on the image is increased.

In step 101, the control unit 40 sets one (1) to each of a variable i representing the sequence order per each divided region and a variable j representing an image capturing number per each divided region. In step 102, the control unit 40 controls the CMOS image capturing element 32 o capture the real time image. In step 103, the control unit 40 extracts the divided region with the sequence order i from the real time image captured in step 102.

In the embodiment, when the image capturing number j is equal to or greater than two (j≥2), the image data of the divided region of the sequence order i extracted from the image captured in the previous image capturing cycle. Accordingly, in step 104, when the image capturing number j is equal to or greater than two (j≥2), the control unit 40 generates the differential image between the image of the divided region with the sequence order i extracted from the real time image in step 103 and the image of the divided region with the sequence order i extracted from the image captured in the previous image capturing cycle and stored in the frame memory 42. It should be noted that when the image capturing number j is equal to one (j=1), the control unit 40 does not generate the differential image in step 104.

In step 105. the control unit 40 overwrites and stores the image data of the divided region with the sequence order i extracted from the real time image in step 103 in the frame memory 42.

In step 106, the control unit 40 determines whether the divided region with the sequence order i has a portion with brightness changed from the previous image capturing cycle based on whether the differential image generated in step 104 has pixels with brightness greater than a reference value. When the control unit 40 determines that the divided region with the sequence order i does not have the portion with brightness changed from the previous image capturing cycle in step 106, the process proceeds to step 108.

In step 108, the control unit 40 increases the image capturing number j by one. In step 109, the control unit 40 determines whether the image capturing number j reaches an upper limit value jmax of the image capturing number defined in advance.

In the second embodiment, when the user operates the operation unit 16 to irradiate the instruction beam (infrared light), the remote instruction device 10 controls the infrared light LED 20 to flash in a specific cycle, so that the infrared light LED 20 periodically irradiates the instruction beam (infrared light) in the specific cycle. Accordingly, in the second embodiment, according to the illumination cycle of the infrared light LED 20, when the CMOS image capturing element 32 repeatedly captures the image, the image capturing cycle of the CMOS image capturing element 32 is set such that the CMOS image capturing element 32 captures the image at the timing when the infrared light LED 20 irradiates and stops irradiating the instruction beam (infrared light).

In the second embodiment, the upper limit value jmax of the image capturing number is set such that the infrared light LED 20 switches from stopping the irradiation to irradiating the instruction beam more than a specific number of times during a period of time when the CMOS image capturing element 32 captures the image at the upper limit value jmax of the image capturing number.

In the second embodiment, until when the image capturing number j reaches the upper limit value jmax, the control unit 40 determines that the image capturing number j does not reach the upper limit value jmax of the image capturing number in step 109. As a result, the process returns to step 102, so that the control unit 40 repeatedly performs the process after step 102.

In the second embodiment, when the irradiation position of the instruction beam does not exist in the divided region with the sequence order i, the control unit 40 determines that the image capturing number j reaches the upper limit value jmax of the image capturing number in step 109, so that the process proceeds to step 110. In step 110, the control unit 40 increases the sequence order i by one and returns the image capturing number j to one. Then, the process returns to step 102. In this case, the process described above is repeated on the divided region newly defined as the processing target.

In the second embodiment, during a period of time when the instruction beam is irradiated in the divided region with the sequence order i, when the CMOS image capturing element 32 captures the image at the timing that the infrared light LED 20 irradiates the instruction beam, the control unit 40 determines that the divided region with the sequence order i has the portion with brightness changed from the previous image capturing cycle in step 106. Accordingly, the process proceeds to step 107.

In step 107, the control unit 40 determines whether the number of the changes in brightness in the differential image exceeds a specific number. When the control unit 40 determines that the number of the changes in brightness in the differential image exceeds the specific number, the process proceeds to step 108.

As described above, the upper limit value jmax of the image capturing number is set such that the infrared light LED 20 switches from stopping the irradiation to irradiating the instruction beam more than the specific number of times during a period of time when the CMOS image capturing element 32 captures the image at the upper limit value jmax of the image capturing number. Accordingly, during a period of time when the instruction beam is irradiated in the divided region with the sequence order i, the control unit 40 determines that the divided region with the sequence order i has the portion with brightness changed from the previous image capturing cycle in step 106. Further, the control unit 40 also determines that the number of the changes in brightness in the differential image exceeds the specific number in step 107, so that the process proceeds to step 111.

In step 111, the control unit 40 compares brightness of each of the pixels of the differential image of the divided region with the sequence order i generated in step 104 with a specific value. Accordingly, the control unit 40 extracts the high brightness region on the differential image having the brightness greater than the specific value.

In step 112, the control unit 40 searches for the instruction beam region in the high brightness region of the divided region with the sequence order i on the differential image extracted in step 111. Further, the control unit 40 calculates the position (the center coordinate) of the instruction beam region extracted through the search.

In step 113, the control unit 40 determines whether the instruction beam (the instruction beam region) is detected in the previous sequence of the divided regions one time before. When the control unit 40 determines that the instruction beam (the instruction beam region) is not detected in the previous sequence of the divided regions one time before in step 113, the process proceeds to step 114. In step 114, the control unit 40 outputs the center coordinate of the instruction beam region calculated in step 113 to the electric device 14 as the position of the instruction beam.

When the control unit 40 determines that the instruction beam (the instruction beam region) is detected in the previous sequence of the divided regions one time before in step 113, the process proceeds to step 115. In step 114, the control unit 40 calculates the relative position of the position of the instruction beam calculated in step 112 this time relative to the position of the instruction beam detected in the previous sequence of the divided regions one time before. Further, the control unit 40 outputs the relative position of the position of the instruction beam region calculated this time to the electric device 14.

In step 116, the control unit 40 determines the sequence order of the divided regions in the next sequence of the divided regions according to the result whether the instruction beam region is detected one of the divided regions in the sequence of the divided regions this time.

More specifically, the control unit 40 determines the sequence order such that the specific one of the divided regions, in which the instruction beam (the instruction beam region) is detected in the sequence of the divided regions next time, is sequenced (processed) first, and the sequence order (the processing order) becomes a lower order as the distance from the specific one of the divided regions on the image becomes greater. It should be noted that the process after step 86 is similar to that in the first embodiment, and an explanation thereof is omitted.

As explained above, according to the second embodiment, the infrared light position detection process is performed in the divided regions as the unit having the area smaller than that of the entire image. Further, the sequence order (the processing order) of each of the divided regions is determined such that the divided region having the higher probability of the existence of the instruction beam is sequenced (processed) first. Accordingly, it is possible to reduce the period of time for extracting the instruction beam. Further, it is possible to reduce the capacity of the frame memory 42 and the capacity of the memory 40B used as the work memory.

Third Embodiment

A third embodiment of the present invention will be explained next. It should be noted that components in the third embodiment similar to those in the first embodiment and the second embodiment are designated with the same reference numerals, and explanations thereof are omitted.

Figure 7:
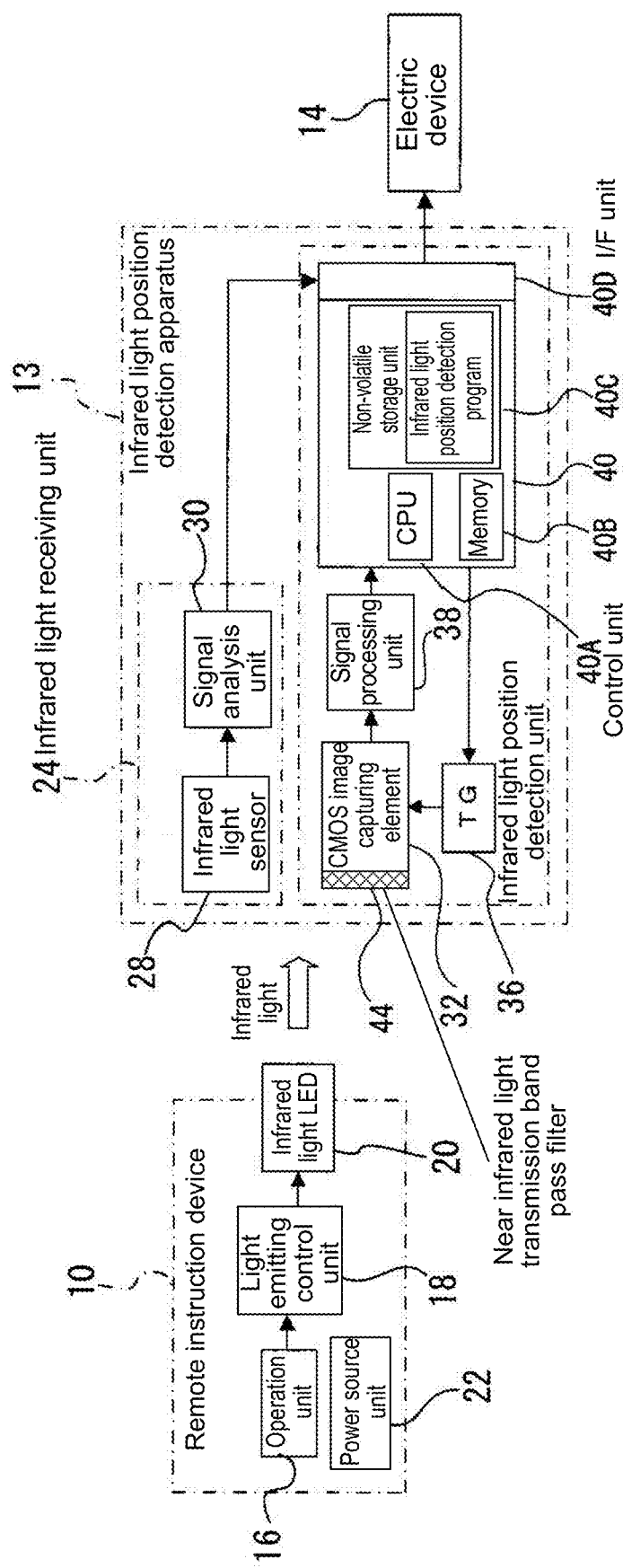
FIG. 7 is a block diagram showing a configuration of an infrared light position detection apparatus and a remote control device according to a third embodiment of the present invention.

FIG. 7 is a block diagram showing a configuration of an infrared light position detection apparatus 13, the remote control device 10 and the electric device 14 according to the third embodiment of the present invention.

As shown in FIG. 7, different from the infrared light position detection apparatus 12 in the first embodiment, the infrared light position detection apparatus 13 in the third embodiment includes a near infrared light transmission band pass filter 44 instead of the visible light cut filter 34. Further, in the infrared light position detection apparatus 13, the frame memory 42 is omitted. A global shutter is disposed on the CMOS image capturing element 32, so that it is possible to simultaneously complete the exposure of all the optical electrical conversion cells of the CMOS image capturing element 32.

In the third embodiment, similar to the visible light cut filter 34, the near infrared light transmission band pass filter 44 is disposed on the front surface of the light receiving surface of the CMOS image capturing element 32. Further, as shown in FIG. 8 as an example, the near infrared light transmission band pass filter 44 exhibits an irradiation spectrum intensity characteristic, in which only near infrared light having a narrow wave length range with a center thereof at 940 nm is passed.

Figure 8:
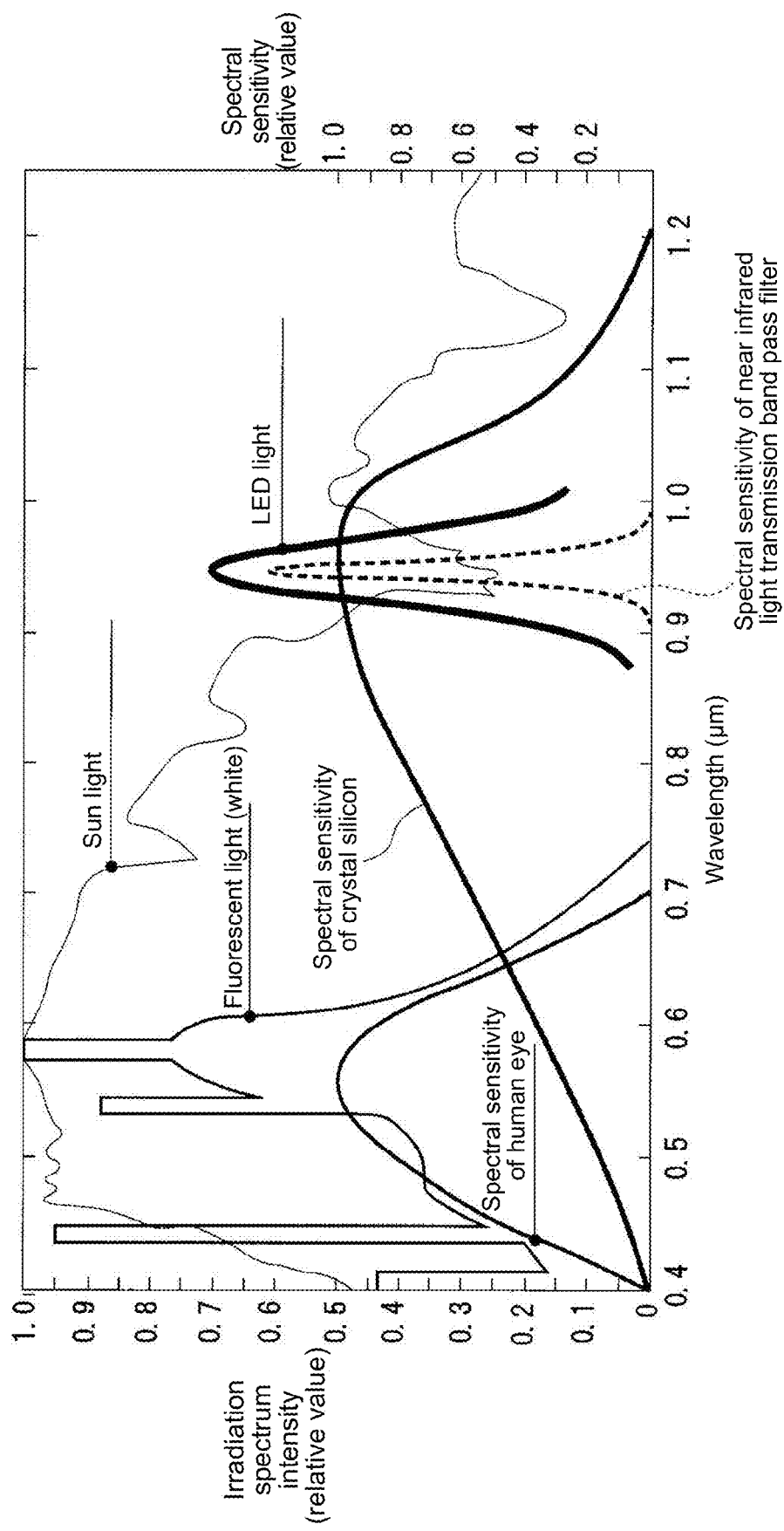
FIG. 8 is a graph showing a relationship between an irradiation spectrum intensity (a relative value) and a wave length (an irradiation spectrum intensity characteristic) of the sun light, the fluorescent light (white), and LED light, and a relationship between a spectral sensitivity (an absolute value) and the wave length (a spectral sensitivity characteristic) of crystal silicon, a human eye, and a near infrared light transmission band pass filter of the infrared light position detection apparatus according to the third embodiment of the present invention.

FIG. 8 is a graph showing a relationship between an irradiation spectrum intensity (a relative value) and a wave length (the irradiation spectrum intensity characteristic) of the sun light, the fluorescent light (white), and LED light, and a relationship between a spectral sensitivity (an absolute value) and the wave length (a spectral sensitivity characteristic) of crystal silicon, a human eye, and the near infrared light transmission band pass filter 44 of the infrared light position detection apparatus 13 according to the third embodiment of the present invention.

Figure 10A:
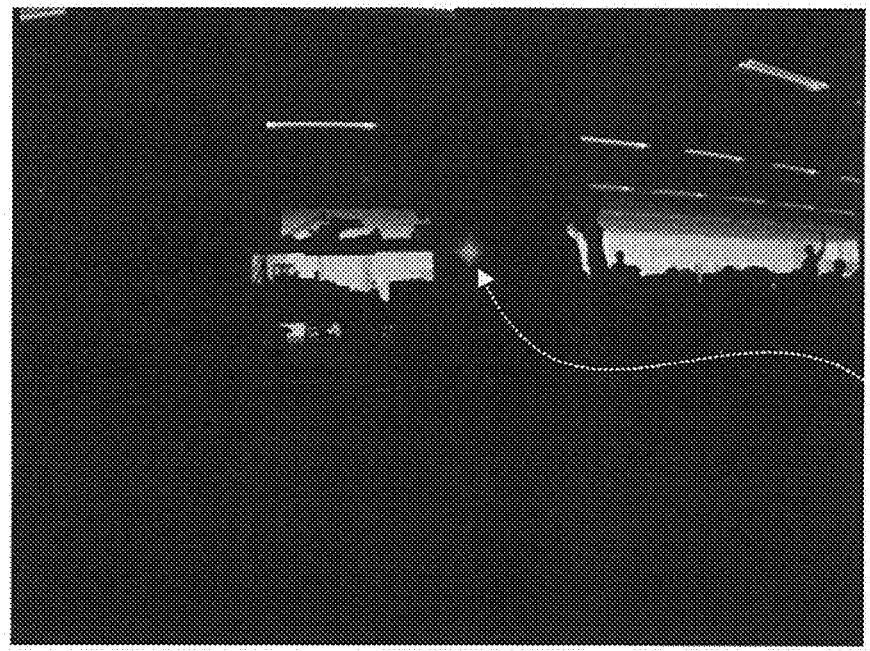
Figure 10B:
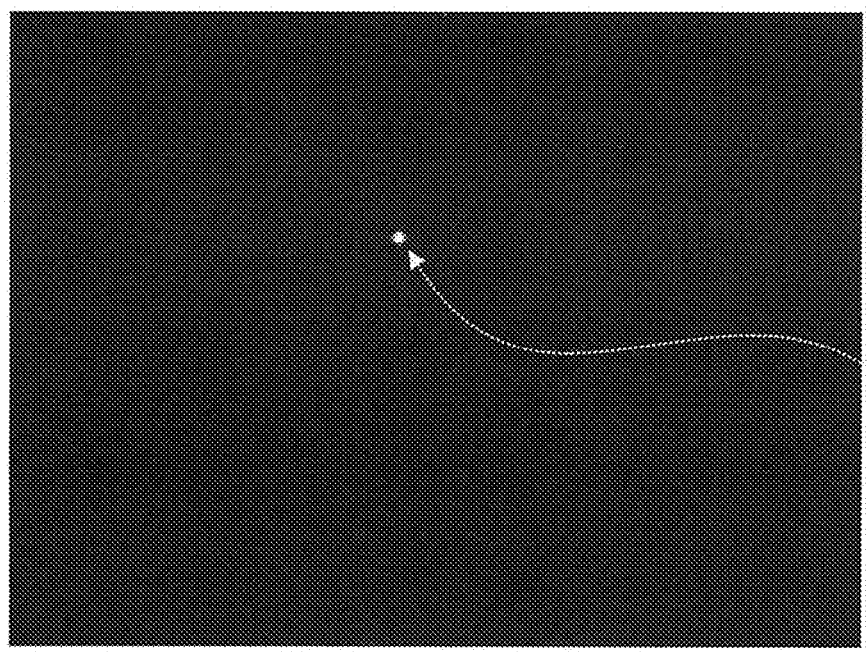
Figure 11:
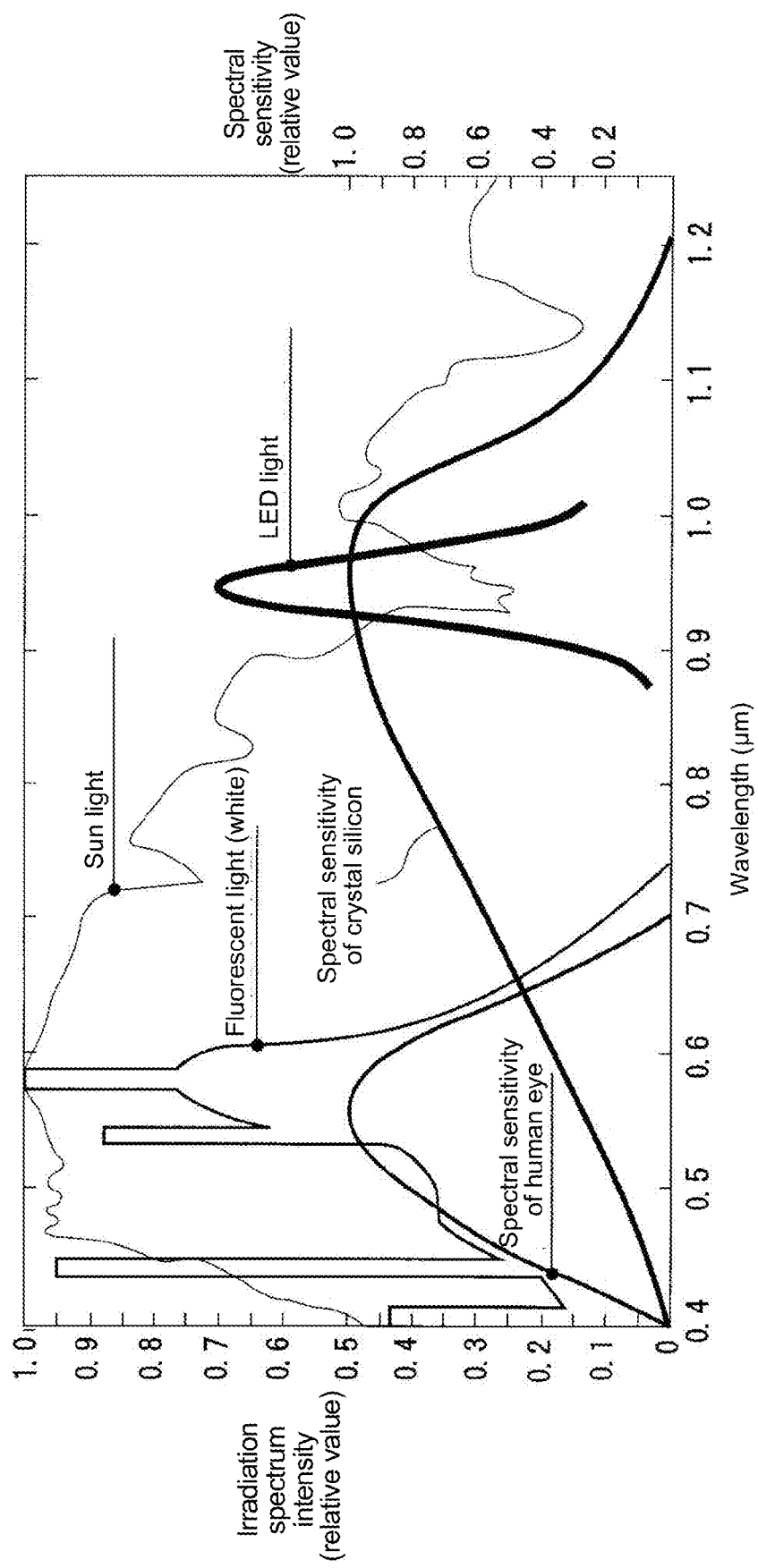
FIG. 11 is a graph showing a relationship between an irradiation spectrum intensity (a relative value) and a wave length (an irradiation spectrum intensity characteristic) of the sun light, the fluorescent light (white), and LED light, and a relationship between a spectral sensitivity (an absolute value) and the wave length (a spectral sensitivity characteristic) of crystal silicon and a human eye.

In the embodiment, the CMOS image capturing element 32 is configured to capture the image through the near infrared light transmission band pass filter 44 as shown in FIG. 10(B). FIGS. 10(A) and 10(B) are photographic views showing examples of the images of the infrared light position detection apparatus 13 according to the third embodiment of the present invention. More specifically, FIG. 10(A) is a photographic view showing an example of the image captured through a visible light cut filter and FIG. 10(B) is a photographic view showing an example of the image captured through the near infrared light transmission band pass filter 44 of the infrared light position detection apparatus 13.

As shown in FIG. 10(B), different from the example shown in FIG. 10(A), only the instruction beam region has brightness in the image. It should be noted that the near infrared light transmission band pass filter 44 corresponds to an example of the filter unit or the band pass filter of the invention.

Figure 9:
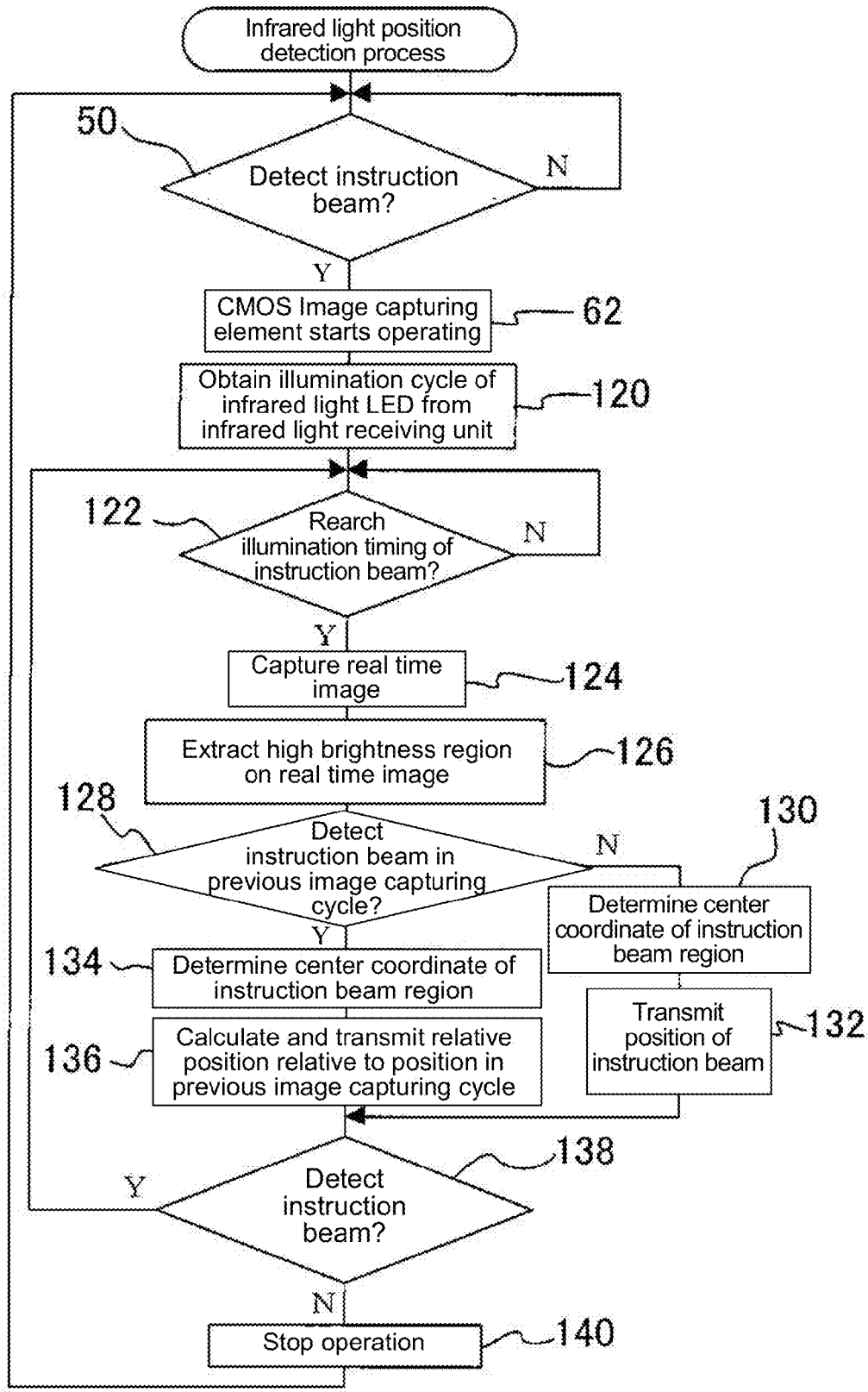
FIG. 9 is a flow chart showing an operation of the infrared light position detection apparatus in an infrared light position detection process according to the third embodiment of the present invention.

An infrared light position detection process will be examined next with reference to FIG. 9. FIG. 9 is a flow chart showing an operation of the infrared light position detection apparatus 13 in the infrared light position detection process according to the third embodiment of the present invention. It should be noted that the control unit 40 corresponds to an example of the control unit or the detection unit of the present invention for performing the infrared light position detection process.

In step 50, the control unit 40 determines whether the infrared light sensor 28 detects the instruction beam. When the control unit 40 determines that the infrared light sensor 28 does detect the instruction beam in step 50, the process proceeds to step 62. In step 62, the control unit 40 starts supplying power to the CMOS image capturing element 32 and the TG 36 starts transmitting the clock signal to the CMOS image capturing element 32, so that the CMOS image capturing element 32 starts operating.

In the third embodiment, when the infrared light sensor 28 detects infrared light including the instruction beam, the signal analysis unit 30 of the infrared light receiving unit 24 is configured to analyze the signal wave shape of the instruction beam. It should be noted that the signal analysis unit 30 of the infrared light receiving unit 24 is configured to analyze the illumination cycle of the infrared light LED 20. In step 120, the control unit 40 obtains the illumination cycle of the infrared light LED 20 analyzed with the signal analysis unit 30 of the infrared light receiving unit 24 from the infrared light receiving unit 24.

In step 122, the control unit 40 determines whether the illumination timing of the infrared light LED 20 (the irradiation timing of the instruction beam from the remote instruction device 10) is reached according to the illumination cycle of the infrared light LED 20 obtained in step 120. When the control unit 40 determines that the illumination timing of the infrared light LED 20 is not reached, step 122 is repeated until the control unit 40 determines that the illumination timing of the infrared light LED 20 is reached. When the control unit 40 determines that the illumination timing (the irradiation timing of the instruction beam from the remote instruction device 10) of the infrared light LED 20 is reached, the process proceeds to step 124. In step 124, the control unit 40 controls the CMOS image capturing element 32 to capture the real time image.

As shown in FIG. 8, the sun light has a spectrum at 940 nm that passes through the near infrared light transmission band pass filter 44. Accordingly, when the CMOS image capturing element 32 captures the real time image, the near infrared light transmission band pass filter 44 controls a shutter timing of the global shutter of the CMOS image capturing element 32 (to shorten the exposure time), so that the spectrum of the sun light at 940 nm has an intensity smaller than a sensitivity limit of the CMOS image capturing element 32. As a result, the CMOS image capturing element 32 does not detect the spectrum of the sun light at 940 nm, so that only the instruction beam region having brightness is displayed in the image.

In step 126, the control unit 40 compares brightness of each of the pixels on the real time image captured in step 124 with a specific value, so that the control unit 40 extracts the high brightness region having brightness greater than the specific value on the real time image.

In step 128, the control unit 40 determines whether the instruction beam (the instruction beam region) is detected when the CMOS image capturing element 32 captured the image in one image capturing cycle before (the previous image capturing cycle). When the CMOS image capturing element 32 captures the image for the first time after the control unit 40 determines that the infrared light sensor 28 detects the instruction beam in step 50, the control unit 40 determines that the instruction beam (the instruction beam region) is not detected in the previous image capturing cycle in step 128, and the process proceeds to step 130.

In step 130, the control unit 40 searches for and extracts the instruction beam region in the high brightness region on the real image. Further, the control unit 40 determines the center coordinate of the instruction beam region thus searched for and extracted. In step 80, the control unit 40 transmits the center coordinate of the instruction beam region calculated in step 130 to the electric device 14 as the position of the instruction beam.

When the CMOS image capturing element 32 captures the image for the second time or later after the control unit 40 determines that the infrared light sensor 28 detects the instruction beam in step 50, the control unit 40 determines that the instruction beam (the instruction beam region) is detected in the previous image capturing cycle in step 128, and the process proceeds to step 134. In step 134, the control unit 40 defines the search range of the instruction beam region with the position of the instruction beam detected in the previous image capturing cycle of the CMOS image capturing element 32 as the reference. Then, the control unit 40 searches for and extracts the instruction beam region within the search range thus defined. Further, the control unit 40 calculates the center coordinate of the instruction beam region thus searched for and extracted.

In step 136, the control unit 40 calculates the relative position of the position of the instruction beam extracted this time relative to the position of the instruction beam in the previous image capturing cycle. Further, the control unit 40 transmits the relative position of the position of the instruction beam extracted this time and thus calculated relative to the position of the instruction beam in the previous image capturing cycle to the electric device 14.

In step 138, the control unit 40 determines whether the infrared light sensor 28 detects the instruction beam. When the control unit 40 determines that the infrared light sensor 28 detects the instruction beam in step 138, the process returns to step 122. Accordingly, the process from step 122 to step 138 is repeated until the control unit 40 determines that the infrared light sensor 28 does not detect the instruction beam in step 138. Accordingly, when the user holding the remote instruction device 10 operates and changes an inclination angle of the remote instruction device 10 to change an irradiation direction of the instruction beam from the remote instruction device 10 for remotely controlling the electric device 14, it is possible to detect the change in the position of the instruction beam, so that the detection result is transmitted to the electric device 14 as needed.

In the embodiment, when the user stops operating the operation unit 16 of the remote instruction device 10, the infrared light LED 20 of the remote instruction device 10 stops irradiating the instruction beam. Accordingly, in step 138, the control unit 40 determines that the infrared light sensor 28 does not detect the instruction beam, and the process proceeds to step 140. In step 140, the control unit 40 stops the operation of the CMOS image capturing element 32. After the control unit 40 performs the operation in step 88, the process returns to step 50.

As explained above, in the third embodiment, the near infrared light transmission band pass filter 44 is disposed so that the illumination of the infrared light LED 20 is synchronized with the image capturing of the CMOS image capturing element 32. Further, the exposure time of the CMOS image capturing element 32 is shortened so that the spectrum of the sun light around 940 nm is not detected. Accordingly, it is possible to obtain the image, in which only the instruction beam region has brightness. As a result, it is possible to eliminate the frame memory 42 for storing the background image, and to eliminate the process of generating the differential image, thereby making the configuration simple and reducing the processing time.

As explained above, in the first embodiment and the second embodiment, the visible light cut filter 34 is disposed in the infrared light position detection apparatus 12. The present invention is not limited thereto, and the near infrared light transmission band pass filter 44 in the third embodiment may be disposed in the infrared light position detection apparatus 12 instead of the visible light cut filter 34.

As explained above, in the third embodiment, the instruction beam region is searched and extracted, so that the position of the instruction beam region is detected. Alternatively, similar to the second embodiment, the image may be divided into a plurality of divided regions, and the instruction beam region is searched and extracted in each of the divided regions as unit.

As explained above, in the first embodiment to the third embodiment, the remote instruction device 10 or the infrared light position detection apparatus 12 has the configuration in which one infrared light LED 20 is disposed. Alternatively, the remote instruction device 10 or the infrared light position detection apparatus 12 may have a configuration in which a plurality of infrared light LEDs 20 is disposed, so that the light emitting control unit 18 controls the infrared light LEDs 20 to start and stop emitting light simultaneously.

In this case, in the infrared light position detection process, it may be configured such that the instruction beam regions having the same number as the infrared light LEDs 20 are individually searched and extracted. Then, the angle of the remote instruction device 10 around an axis crossing the direction along which the infrared light LEDs 20 are arranged is detected.

As explained above, in the first embodiment to the third embodiment, the infrared light receiving unit 24 is provided for detecting the instruction beam (the instruction beam region) and the like. The present invention is not limited thereto, and it is possible to omit the infrared light receiving unit 24. In this case, it may be configured such that brightness of the image corresponding to a plurality of continuous frames captured with the CMOS image capturing element 32 is compared per pixel. Accordingly, it is possible to determine whether the remote instruction device 10 irradiates infrared light (the instruction beam) based on whether brightness is changed in the shape or the size corresponding to the instruction beam region.

As explained above, in the first embodiment to the third embodiment, the instruction beam is in the near infrared range as the example of the instruction beam in the invisible light wave length range. The present invention is not limited thereto, and the instruction beam in the invisible light wave length range may be light in the ultraviolet range. Further, instead of the CMOS image capturing element 32, other image capturing element such as CCD and the like may be adopted.

As explained above, in the first embodiment to the third embodiment, the infrared light position detection program is stored (installed) in the storage unit 40C of the control unit 40 in advance. Alternatively, the infrared light position detection program may be stored in a recoding medium such as CD-ROM, DVD-ROM and the like.

The disclosure of Japanese Patent Application No. 2011-181925, filed on Aug. 23, 2011, is incorporated in the application by reference.

While the present invention has been explained with reference to the specific embodiments of the present invention, the explanation is illustrative and the present invention is limited only by the appended claims.

What is claimed is:

1. An instruction beam detection apparatus, comprising:
   an image capturing unit having a global shutter for capturing an image of an instruction beam intermittently irradiated from a light source of a remote control device within a detection range thereof at a timing instructed externally with the global shutter;
   a filter unit for attenuating light irradiated on the image capturing unit in at least one of a short wave length range and a long wave length range relative to a wave length range of the instruction beam;
   a control unit for detecting an illumination cycle of the instruction beam according to the image captured with the image capturing unit so that the image capturing unit is controlled to capture the image at a timing synchronized with an irradiation timing of the instruction beam irradiated from the light source; and
   a detection unit for detecting a position of the instruction beam on a third image according to the third image captured with the image capturing unit in a state that the control unit controls the image capturing unit to capture the third image at a controlled image capturing timing,
   wherein said control unit is configured to detect the illumination cycle adjusted such that a cumulative intensity of light in a wave length range different from that of the instruction beam becomes smaller than a specific value within one cycle during which the image capturing unit captures the third image.

2. The instruction beam detection apparatus according to claim 1, wherein said detection unit is configured to trace a change in the position of the instruction beam on the third image after the detection unit detects the position of the instruction beam on the third image so that the detection unit continuously outputs the change in the position of the instruction beam.

3. The instruction beam detection apparatus according to claim 1, wherein said detection unit is configured to detect positions of a plurality of instruction beams irradiated from the light sources of the remote control device, and said detection unit is configured to detect an angle of the remote control device around an axis crossing a direction along which the light sources are arranged according to a positional relationship of each of the instruction beams.

4. The instruction beam detection apparatus according to claim 1, wherein said detection unit is configured to divide the differential image or the third image into a plurality of divided regions so that the detection unit detects the position of the instruction beam in each of the divided regions.

5. The instruction beam detection apparatus according to claim 4, wherein said detection unit is configured to store the position of the instruction beam in each of the divided regions as a history so that the detection unit detects the position of the instruction beam in each of the divided regions according to an order of a position detection frequency of the instruction beam in each of the divided regions indicated in the history.

6. The instruction beam detection apparatus according to claim 1, wherein said filter unit is configured to attenuate the light a visible light range on the short wave length side relative to the wave length range of the instruction beam when the infrared light range is in an infrared light range.

7. The instruction beam detection apparatus according to claim 1, wherein said filter unit is configured to be a band filter for attenuating the light in the wave length range on the long wave length side relative to an infrared light range.

8. A method of detecting an instruction beam, comprising the steps of:

capturing an image of an instruction beam intermittently irradiated from a light source of a remote control device within a detection range thereof at a timing instructed externally with an image capturing unit having a global shutter;

attenuating light irradiated on the image capturing unit with a filter unit in at least one of a short wave length range and a long wave length range relative to a wave length range of the instruction beam;

detecting an illumination cycle of the instruction beam with a control unit according to the image captured with the image capturing unit so that the image capturing unit is controlled to capture the image at a timing synchronized with an irradiation timing of the instruction beam irradiated from the light source; and detecting a position of the instruction beam on a third image with a detection unit according to the third image captured with the image capturing unit in a state that the control unit controls the image capturing unit to capture the third image at a controlled image capturing timing, and wherein said control unit is configured to detect the illumination cycle adjusted such that a cumulative intensity of light in a wave length range different from that of the instruction beam becomes smaller than a specific value within one cycle during which the image capturing unit captures the third image.

\* \* \* \* \*